United States Patent [19]
Anderson et al.

[11] Patent Number: 6,078,665
[45] Date of Patent: *Jun. 20, 2000

[54] ELECTRONIC ENCRYPTION DEVICE AND METHOD

[75] Inventors: Robert Anderson, Austin; George R. Schultz, Dallas; John P. Heptig, Ft. Worth, all of Tex.

[73] Assignee: Intelligent Security Systems, Inc., Dallas, Tex.

[ * ] Notice: This patent is subject to a terminal disclaimer.

[21] Appl. No.: 08/954,795

[22] Filed: Oct. 21, 1997

Related U.S. Application Data

[63] Continuation-in-part of application No. 08/711,770, Sep. 9, 1996, Pat. No. 5,857,025.

[51] Int. Cl.$^7$ ....................................................... H04L 9/28
[52] U.S. Cl. .................................. 380/28; 380/46; 380/48
[58] Field of Search ................................. 380/28, 46, 48; 708/251, 255

[56] References Cited

U.S. PATENT DOCUMENTS

| | | | |
|---|---|---|---|
| 5,048,086 | 9/1991 | Bianco et al. | 380/28 |
| 5,291,555 | 3/1994 | Cuomo et al. | 380/6 |
| 5,375,169 | 12/1994 | Seheidt et al. | 380/21 |
| 5,377,269 | 12/1994 | Heptig et al. | 380/25 |
| 5,412,729 | 5/1995 | Liu | 380/37 |
| 5,432,697 | 7/1995 | Hayes | 380/46 X |

OTHER PUBLICATIONS

Newell et al., "Syncronization of Chaos Using Proportional Feedback", in "Chaos in Communications" Proceedings of the SPIE vol. 2038 pp. 115–130 (1993) edited by L. Pecora.
Carroll et al., "Synchronizing Chaotic System", in "Chaos in Communications" Proceedings of the SPIE vol. 2038 pp. 32–43 (1993) edited by L. Pecora.
Chu, Morgan et al, *Patents in the Computer Field*, 1991, pp. 316–328.
Cuomu, Kevin M. et al, Synchronization of Lorenz–Based Chaotic Circuits with Applications to Communications, *IEEE Transactions on Circuits and Systems II*, Oct. 193, vol. 40, No. 10, pp. 626–633.
Guynes, Jan L., Impact of System Response Time on State Anxiety, *Communications of the ACM*, Mar. 1988, vol. 31, No. 3, pp. 343–347.
Ditto, W.L. et al, Experimental Control of Chaos, *Physical Review Letters*, Dec. 24, 1990, vol. 65, No. 26, pp. 3211–3214.
Pass™ E$^2$, Xicor, 4K X76041 4×128×8 *Bit*, pp. 1–20.
Pecora, Louis M. et al, Synchronization in Chaotic System, *Physical Review Letters*, Feb. 19, 1990, vol. 64, No. 8, pp. 821–824.
Ott, Edward et al, Controlling Chaos, Mar. 12, 1990, *Physical Review Letters*, vol. 64, No. 11, pp. 1196–1199.
Crutchfield et al., Chaos, *Scientific American* (Dec. 1986); pp. 46–57.
Cuomo et al, Circuit Implementation of Synchronized Chaos with Applications to Communications, *Physical Review Letters*71, *I* (Jul. 1993); pp. 65–68.
Ditto et al, Mastering Chaos, *Scientific American* (Aug. 1993); pp. 78–84.
Hayes, Brian, The Magic Words Are Squeamish Ossifrage, *American Scientist*, 82 (Jul. 1994), pp. 312–316.

(List continued on next page.)

*Primary Examiner*—Pinchus M Laufer
*Attorney, Agent, or Firm*—George R. Schultz; Akin, Gump, Strauss, Hauer & Feld, LLP

[57] ABSTRACT

A device and method is provided using a split processor based architecture to provide physical security of information by implementing a required protocol before releasing information. The information is used as a key to a cryptographic algorithm. A chaotic cryptographic algorithm is also provided including a key space employing six parameters of a Lorentzian system of equations.

78 Claims, 11 Drawing Sheets

Lorenz Attractor Used in Chaos Encryption
Xo = 0.0, Yo = 2.0, Zo = 23.0
Sigma = .01, r = 28, b = 8/3

OTHER PUBLICATIONS

Lesurf, J.C.G., Chaos in Harness, *Nature* 365 (Oct. 1992); pp. 604–605.

Pecora et al, Driving Systems with Chaotic Signals, *Physical Review A* 44, 4 (Aug. 1991); pp. 2374–2383.

Peitgen et al, Chaos and Fractals: New Frontiers in Science. Springer–Verlag. New York, 1992.

Pickover, Clifford A, Chaos in Wonderland. St. Martin's Press. New York, 1994.

Seberry et al, Cryptography: An Introduction to Computer Security. Prentice Hall. Brunswick, Australia (1989), pp. 1–6, 88, 90–108 and 144–145 (1989).

Motorola Imaging Systems Division Fact Sheet, Second Quarter 1988, SG17–D, Rev. 25.

Intel Data Sheet, http://www.intel.com/intel/museum/25anniv/hof/hof_main.htm.

Lorenz Attractor Used in Chaos Encryption
Xo = 0.0, Yo = 2.0, Zo = 23.0
Sigma = .01, r = 28, b = 8/3

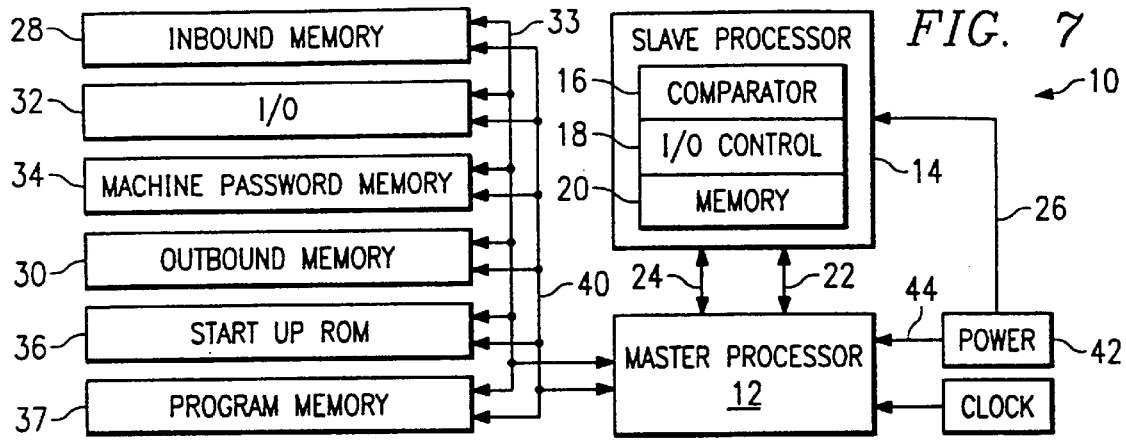
FIG. 7
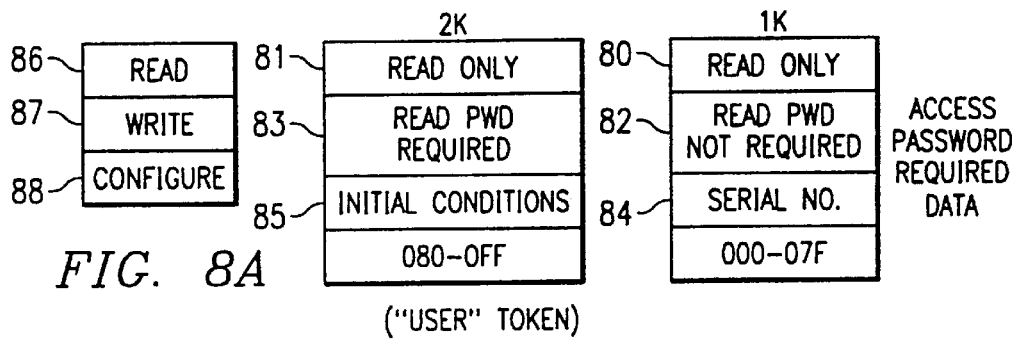
FIG. 8A ("USER" TOKEN)
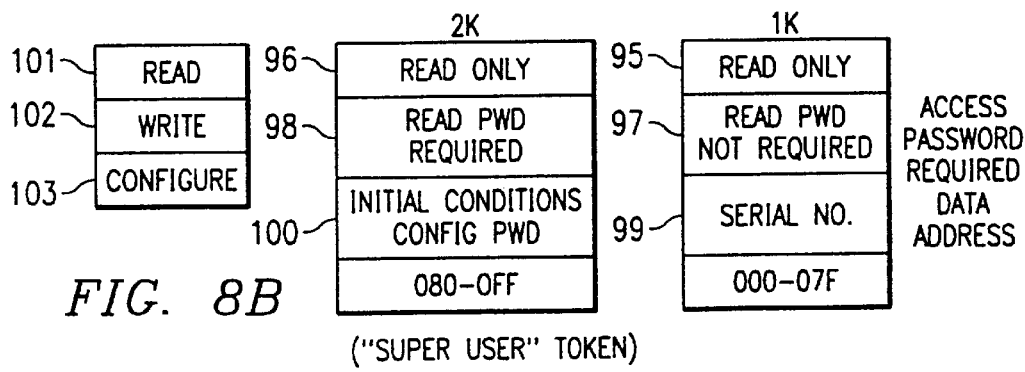
FIG. 8B ("SUPER USER" TOKEN)
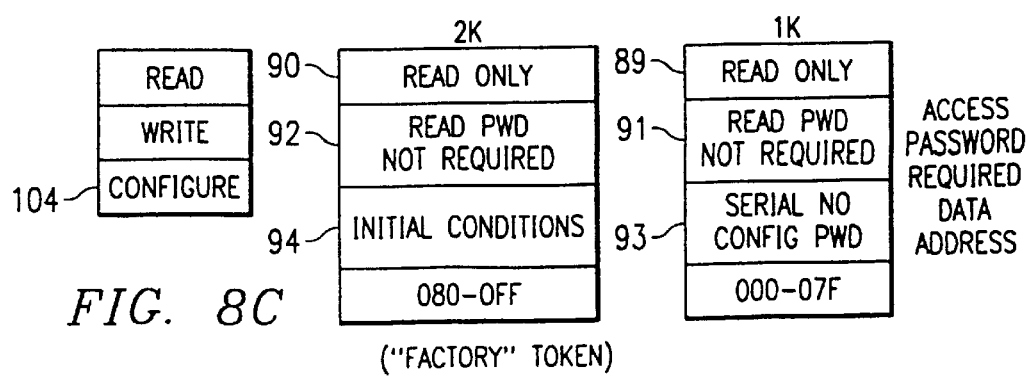
FIG. 8C ("FACTORY" TOKEN)

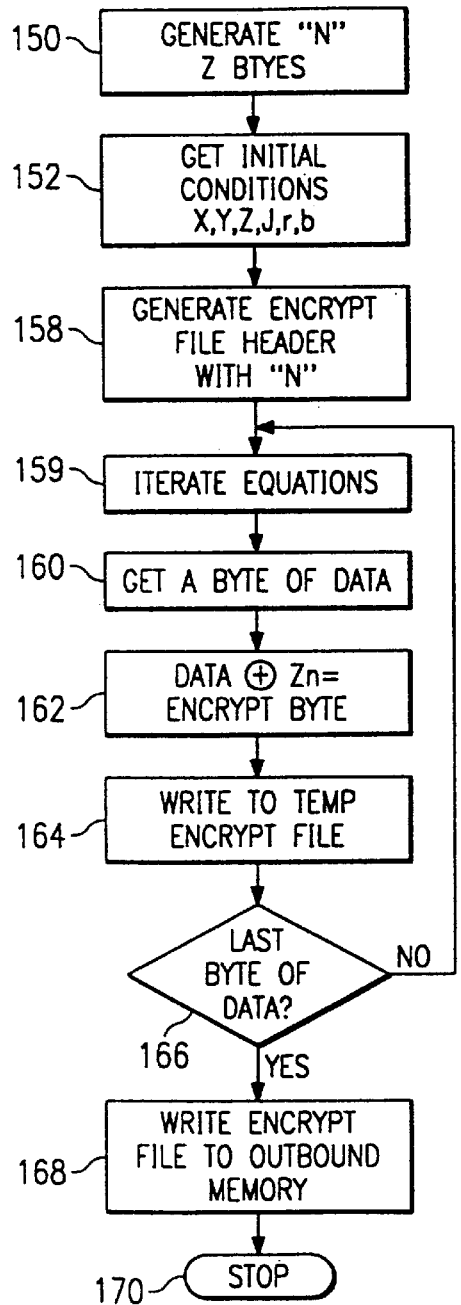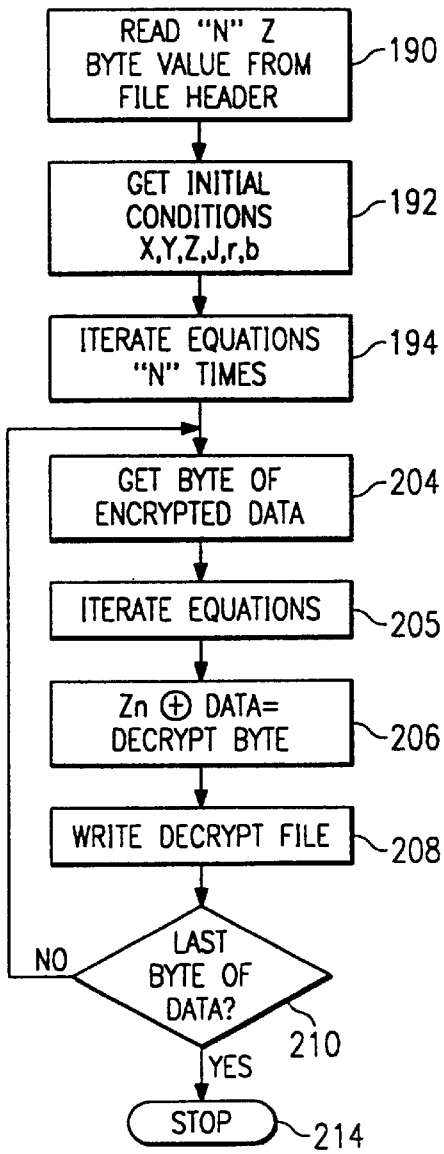
FIG. 11
FIG. 12

ELECTRONIC ENCRYPTION DEVICE AND METHOD

This is a continuation-in-part application of parent application Ser. No. 08/711,770 filed Sep. 9, 1996, U.S. Pat. No. 5,857,025 of issue date Jan. 5, 1999.

FIELD OF THE INVENTION

The present invention relates generally to cryptographic data transmission and storage systems and more specifically, to microprocessor implemented cryptographic systems based on chaos theory.

BACKGROUND OF THE INVENTION

Message encryption has become increasingly necessary to maintain data privacy and integrity when transmitting messages over a computer network. Industry's reliance on computers and data transmission over networks has led to a substantial increase in the use of encryption systems to safeguard messages or data from unauthorized access. Modern encryption systems must account for not only cryptographic security, but physical security of the implementing hardware.

Encryption is the process of transforming a message into a form that is meaningless to everyone except the intended receiver. Cryptography is the science of making this transformation as intricate as possible, so that reversing it without certain key information is difficult, if not impossible.

Encryption algorithms must be invertible transformations so that encrypted messages can be decrypted. All transformations using the encryption algorithm are referred to generally as a "family" of transformations. Within the family of transformations, modem encryption systems use a key or seed which is a parameter which selects a particular transformation from the family of transformations. An important property of encryption algorithms is that unique keys will define unique encrypted messages or ciphertext.

A cryptosystem can be defined as an encryption algorithm, a decryption algorithm and a specific key which produces an unique invertible transformation using the given algorithm. Ideally, a cryptosystem uses the key and the algorithm to produce a flat distribution for all properties of the message to be encrypted, hiding all natural characteristics of the information that make up the message. It should appear to a potential attacker that the message represents random information.

The security of a cryptosystem is directly related to the uncertainty of the attacker in determining the keys used to encrypt the message. Perfect security can be assured if the key is a string of truly random numbers and is as long as the message being encrypted. Such perfect security is known as a "one time pad" if the key is discarded after a single use.

A system is said to be computationally secure if the task of determining the key is computationally infeasible or intractable. A perfectly secure system is useful because the attacker does not have enough information from the ciphertext to determine the key. On the other hand, computationally secure systems are also useful because while the attacker potentially has enough information in the ciphertext to determine the key, he does not have enough time to complete the task.

Computationally secure systems are rated by their resistance to three types of attack, "ciphertext only attack," "known plain text attack," and "chosen plain text attack." In each type of attack, the attacker is given the encryption and decryption algorithms and with this information attempts to decrypt the message. In the ciphertext only attack, the attacker is also given the encrypted message to examine. Any system failing this attack is considered totally insecure. In a known plain text attack, the attacker is given the algorithm, the original unencrypted message and the encrypted message. Cryptosystems which survive this attack are considered reasonably secure. A chosen plain text attack gives the attacker the algorithm, and the ability to encrypt and decrypt any message chosen. The attacker then attempts to derive the key to the encryption algorithm. Cryptosystems which survive this attack are considered to be very secure.

Cryptographically, several encryption schemes are in wide use today, but each is unsatisfactory for several reasons.

The digital encryption system, or DES as it commonly called, has been widely used by industry and the government since 1977. The DES system uses a 56 bit key to encrypt 64 bit data words through a lengthy process of transformations and substitutions. It is also widely acknowledged that the key length is too short for high security. For modern real time encryption applications, DES has fallen out of favor. The DES system has been substantially challenged with modern super computers and is no longer approved for encrypting government messages.

The disadvantages of the DES encryption system are that it is slow and insecure. The complex transformations used by DES require lengthy software programs to be implemented. Additionally, as the length of the message increases, the time to encrypt it under the DES standard grows disproportionally. Obviously, this limitation is undesirable in an cryptographic system.

Dedicated circuits are available which are faster, but so far, they are prohibitively expensive. A second problem with the DES encryption algorithm is that it provides no description of physical security with respect to the encryption key. Therefore, if the physical security of the key is compromised, the robustness the DES encryption algorithm is no protection. A third disadvantage of DES is that it leaves a signature in the encrypted file sufficient to identify that the DES algorithm has been used. A fourth disadvantage of DES is that the computation time to transverse the transformations required to encrypt a large message or data file is substantial The Rivest-Shamir-Adelman (RSA) algorithm is also in wide use. It relies on the receiver giving the sender a "public key" and the encryption algorithm. The sender encrypts the message and sends it to the receiver using the public key and the algorithm. The receiver then can decode the message using a "private key." Only the intended receiver can decode the encrypted message.

The RSA algorithm is asymmetrical, which means that a different key must be used for encrypting and decrypting messages. It uses keys of between 150 and 200 digits long. To invoke the algorithm, RSA requires calculation of a private key derived from the least common multiple of two large prime numbers. The difficulty in breaking and thus the security of the RSA cryptosystem lies in factoring the two prime numbers. This is an example of an intractable but solvable problem.

One disadvantage of the RSA cryptosystem is that its security relies on the determination of two large prime numbers. As available computer speeds increase, the determination of these two prime numbers will become faster. Moreover, there is substantial mathematical research ongoing to determine new prime number factoring algorithms. Therefore the security of the RSA cryptosystem is steadily and predictably decreasing. Most recently a 160 digit key was broken in as little as eight (8) months. Another disadvantage is that the RSA encryption system is very slow when implemented in software. RSA is about 1000 times slower than DES. Additionally, as the length of the encrypted message increases, the encryption time also increases drastically. As with DES, RSA can leave an encryption signature behind in the encrypted file which allows the encrypting algorithm to be identified. Another problem is that the RSA cryptosystem does not address physical security of the required keys.

Chaos theory has been suggested as a basis for cryptosystems. Chaos theory is based on simple deterministic systems that demonstrate random behavior. Some examples of natural phenomenon exhibiting chaotic behavior include atmospheric weather and turbulent water flow. Uncertainties in information about the system, such as errors, become magnified by the nonlinearity of the equations in the system, resulting in unpredictability of the system after a very short time. Chaotic systems, like the Lorentzian system, are absolutely deterministic given an acceptable set of initial conditions. For the same initial conditions, the system produces the same results. So, even if the results are random, they are repeatable for a given set of initial conditions.

U.S. Pat. No. 5,291,555, to Cuomo and Oppenheim discloses an analog electrical circuit which utilizes a system of Lorenz equations which exhibit chaotic behavior. In implementing these equations, a chaotic driver signal $u_t$ is fed into subsystems synchronizing two additional signals $v_t$ and $w_t$. Additionally, $u_t$ is summed with a data signal $m_t$. The driver signal $u_t$ is only slightly perturbed by summing with the message $m_t$ and therefore masks the message $m_t$. The resulting encrypted signal, $c_t$ is transmitted to the receiving station that uses $c_t$ to synchronize the receiver's subsystems to recreate the original driver signal $u_t$. This driver signal is then subtracted from $c_t$, with the results being the original message $m_t$.

Cuomo and Oppenheim have also disclosed a digital encoding methodology (See Cuomo, Oppenheim, and Strogatz, *Synchronization of Lorenz Based Chaotic Circuits with Applications to Communications,* IEEE Transactions on Circuits and Systems—II, *Analog and Digital Signal Processing* 40, 10 (October 1993) 626–633; Also see Cuomo and Oppenheim, *Circuit Implementation of Synchronized Chaos with Applications to Communications,* Physical Letter 71, 1, Jul. 5, 1993, pp. 65–68) that modifies the subsystem of $w_t$ by modifying a constant b by the message stream $m_t$. The receiver would recognize digital 1's from 0's by the error induced by comparison from a nonencoded driver's signal $u_t$.

Both Cuomo and Oppenheim disclosures require that identical electrical components be used in the sending and receiving systems. This is a major drawback for a cryptosystem because of the difficulty in such construction on a commercial scale. Additionally, both disclosures teach systems which are slow because they require a great deal of time to synchronize the receiver's components to the transmitter's components; this is especially a problem with the digital application. An additional drawback of the Cuomo and Oppenheim disclosures that each must use a narrow defined set of "tuning parameters" for each equation, which must be identical in both the transmitter and receiving circuits or digital applications.

A second application of chaos theory is disclosed by U.S. Pat. No. 5,048,068 to Bianco and Reed. Bianco discloses the use of a single nonlinear logistic difference equation:

$$x_{n+1}=\mu_r x_n(1-x_n)$$

where $\mu$ is a tuning parameter between 3.5–4.0 and $x_n$ is a randomly selected number between 0 and 1 which serves as a key. In this invention, the key is multiplied with the fixed tuning parameter $\mu$. The resulting value is then iterated in the logistic difference equation to arrive at a chaotic stream of numbers. This chaotic stream of numbers is then compared with a range and a center point. If the iterated results are in the top of the range, they are assigned a digital 1, if they are in the lower half of the range, they are assigned a digital zero. If they are not in the range they are discarded. A domain transformation results, resulting in a stream of 1's and 0's. The stream of 1's and 0's is then added to a binary message to produce an encrypted message.

The Bianco system has several problems. First, it is slow. The logistic difference equation produces a random set of numbers. The numbers may be outside the predetermined range as required by the disclosure. If the number produced by the equation is outside the range, the equation must be reiterated to produce another number. This process must repeat until the equation produces a number within the given range. Sometimes this can require many cycles before a useable number is generated. Second, the logistic difference equation produces a random set of numbers that is statistically weighted toward the top and bottom of the given range; therefore, it leaves a statistical signature which weakens its cryptographic value. Third, the allowable keyspace for the logistic equation is very small, allowing brute force or iterative attacks to become possible. Fourth, no provision is made for assuring that the same key is not used repeatedly. Considering the small allowable keyspace, the same key must be used a number of times. The more often the same key is used, the more the cryptosystem becomes vulnerable to a chosen plaintext attack, thereby reducing its security. Fifth, no provision is made for checking the key to assure that chaotic behavior results from the equation. If the key chosen does not result in chaotic behavior the Bianco system fails entirely.

SUMMARY OF THE INVENTION

The present invention provides a device and method which meets the needs of both physical and cryptographic security for cryptographic system. Physical security is provided by a split microprocessor based architecture. The architecture provides physical security of the key by implementing a required protocol before releasing critical information used by the cryptographic algorithm. In the preferred embodiment, this protocol includes the fragmentation of the protocol into three discrete storage areas. Each of the fragments is required in the protocol before key information is released. The physical security provided by the split processor architecture, and the fragmentation of required key information makes physical protection of the key virtually absolute.

The present invention further provides for cryptographic security by an improved digital implementation of the Lorentzian system of chaotic equations. The preferred embodiment of the invention provides that six parameters in these three Lorenz equations be chosen as a cryptographic key. A seventh parameter, "iterate sum", is also provided which assures the uniqueness of each encrypted message. The improved digital implementation provides encrypted files which leave no statistical signature behind which would enable an attacker to determine which algorithm was used to encrypt the file. The digital application of the Lorenz system of equations as a cryptosystem virtually guarantees messages encrypted using the present invention will be invincible to chosen plain text attacks, making it an extremely secure cryptosystem. Also, the improved implementation of the Lorenz system provides a robust cryptosystem without the need for domain transformations or repetitive iterative cycle times.

The invention further provides for a definition of a ideal key space for the cryptographic algorithm. Redefinition of an ideal keyspace allows iterative checking of random keys during encryption to be eliminated or reduced which substantially increases the speed of the encryption algorithm. The invention also provides for preemptive checking of keys chosen from the ideal keyspace so that only keys which result in chaotic behavior are used by the encryption and decryption algorithm. Additionally, the invention provides for, but does not require, assignment of serial numbers to each unique key, which avoids the need to define a new key for each application, and assures it has not been used previously.

The invention further provides for a keyspace which is sufficiently large to frustrate brute force attacks. That is simply trying each combination of keys possible until the encrypted message is discovered. The combination of the software and hardware provided ensures that such an attack would take well beyond the expected lifetime of the universe to complete successfully.

The advantages of the present invention can be applied to virtually any type of binary data transmission or storage. The most common practical application is the protection of data stored or transmitted by computers, such as on the Internet. However, the invention lends itself well to any other type of security need where binary data is transmitted or stored. The invention is especially well suited to applications where real time encryption and decryption of data is required, such as digital cellular telephones or wireless data transmission networks.

BRIEF DESCRIPTION OF THE DRAWINGS

FIG. 7 shows the architecture of the preferred embodiment.

FIG. 8a is a graphic representation of a memory model of the slave processor as disclosed configured to act as an "user class" token.

FIG. 8b is a graphic representation of a memory model of the slave processor as disclosed configured to act as an "super user" token.

FIG. 8c is a graphic representation of a memory model of the slave processor as disclosed configured to act as an "factory" token.

FIG. 11 shows a flow chart of the software executed by the preferred embodiment to encrypt data.

FIG. 12 shows a flow chart of the software executed by the preferred embodiment to decrypt data.

DETAILED DESCRIPTION OF THE INVENTION

The preferred embodiment of the invention employs an encryption algorithm which is a set of nonlinear equations developed by Edward Lorenz of MIT, 1963, from research into predicting atmospheric fluctuations. A reduced set of these equations is:

$$x'=-\sigma x+\sigma y$$

$$y'=rx-y-xz$$

$$z'=-bz+xy$$

where the results x', y' and z' are derived by iterating the initial conditions x, y, z, σ, b and r. An iteration results when the results x', y' and z' are substituted into the equations for x, y and z, to arrive at new results. Other equations which demonstrate chaotic behavior may be employed in the present invention with varying degrees of success, such as Nonlinear Dynamics, Vander pol/Duffing's Equations, R össler Attractor, periodically forced systems, B-Z reactor and Henon-Heiles equation among others.

The Lorenz system is a simple deterministic system exhibiting random behavior when iterated with appropriate initial conditions. A three dimensional plot of the output of one system Lorenz equations iterated 10,000 times is shown as FIG. 1. A fundamental tenet of chaos theory is that behavior of the system is predictable in the short term but unpredictable in the long term. Therefore, the system can act as a random number generator with which to encrypt a message, in effect, creating a stream cipher algorithm. In the preferred embodiment, the cryptographic "key" is a unique set of initial conditions used to start the iteration process. This consists of three static variables σ, r and b and three dynamic variables x, y and z. Because encryption and decryption of the system is accomplished using the same algorithm, the preferred embodiment of invention is a symmetric encryption algorithm and requires the use of the same key to encrypt and then decrypt a message.

For absolute security, the message to be encrypted must be encrypted with a truly random stream of encrypting bytes. A truly random stream of encryption bytes is known as a "one time pad". Such a random stream is produced by the equations disclosed. The stream is used to encrypt one byte of the message at a time and therefore achieves the objective of a "one time pad" and assures that the message space and the encrypting space are of equal length and cardinality.

Figure 2:
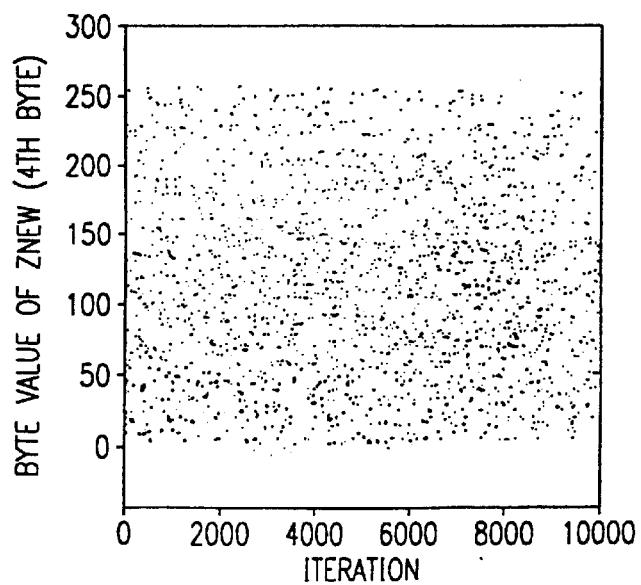
FIG. 2 shows a plot of the value of the fourth byte of the z stream versus iteration number for ten thousand iterations of the disclosed equations.
Figure 3:
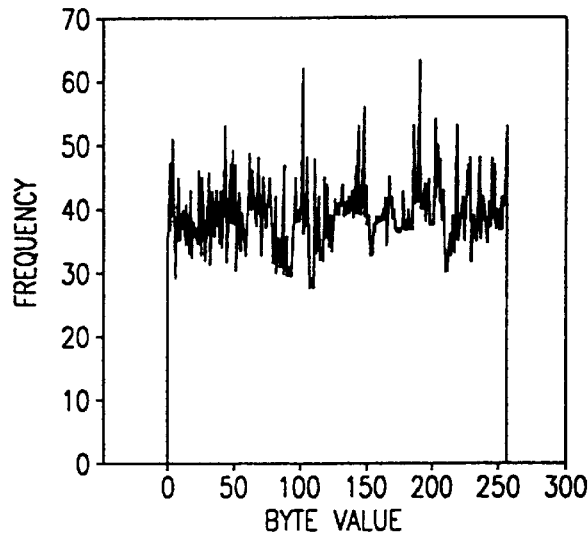
FIG. 3 shows a spectral distribution across a possible space of 0–255 integer values of the byte value versus the frequency of occurrence.

One advantage of the system of Lorenz equations employed by the preferred embodiment of the current invention is the production of three streams of numbers, x', y' and z', to be used to derive encrypting bytes. For example, if the Lorenz equations are iterated using a given set of initial conditions producing chaotic behavior, preserving the resulting values to fifteen significant figures, FIG. 2 shows the plot of the value of the fourth byte of the Z stream versus iteration number when the equations are iterated 10,000 times. FIG. 3 shows a spectral distribution across a possible space of 0 to 255 integer values of the byte value versus the frequency of occurrence. The spectrum shows that the values are randomly distributed across the potential of byte values, demonstrating that the fourth byte of the Z stream has roughly an equal probability of being anything from 0 to 255 in value. Different initial conditions can change the spectrum from uniform to more erratic in appearance. However, virtually any byte chosen from any of the iterate streams will produce nearly perfect random results.

The preferred embodiment of the present invention uses the initial conditions for the Lorentzian system given as the cryptographic "key". The initial condition, or key, consists of the starting values of the three dynamic variables x, y and z and the three static variables σ, r and b. The variables create a six dimensional key space that defines the possible valid keys which can be used in the cryptographic system.

Figure 1:
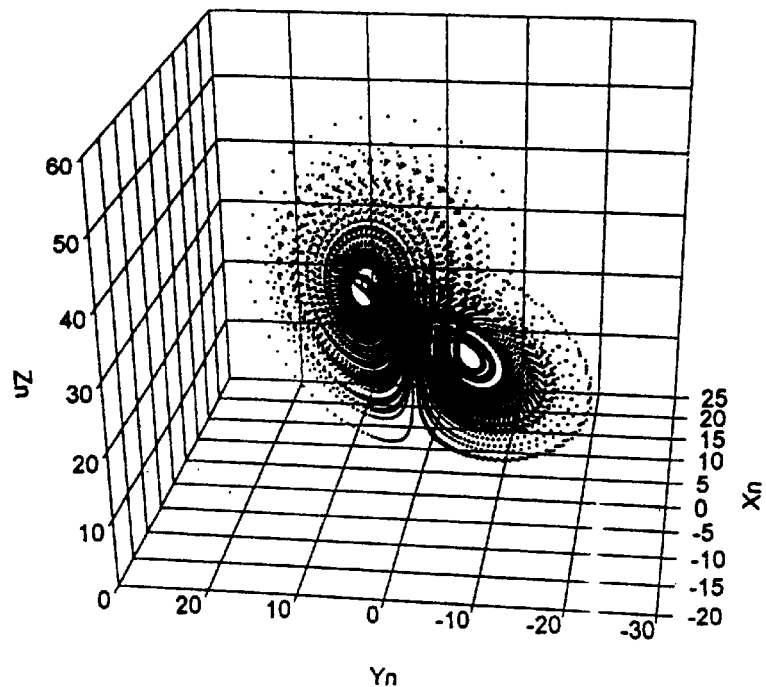
FIG. 1 shows a three dimensional plot of the results of the Lorenz equations disclosed iterated ten thousand times.
Figure 4:
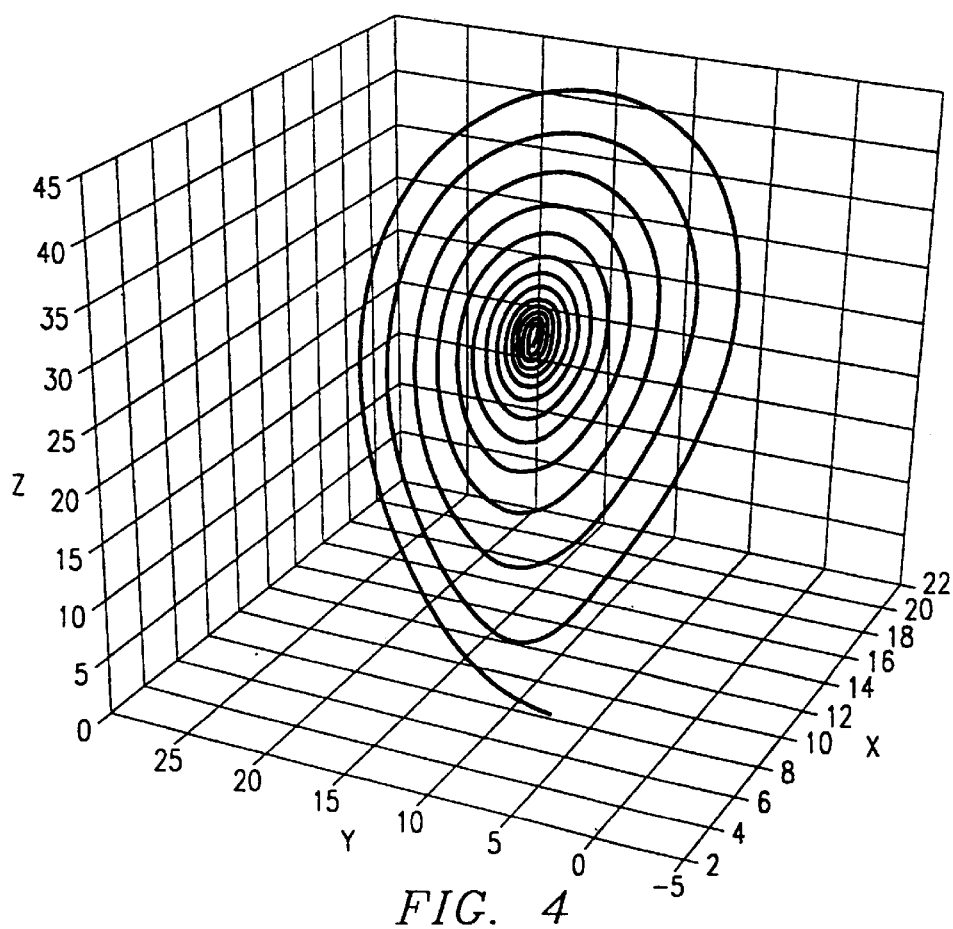
FIG. 4 shows the disclosed cryptographic system response spiraling into a single x,y,z point.
Figure 5:
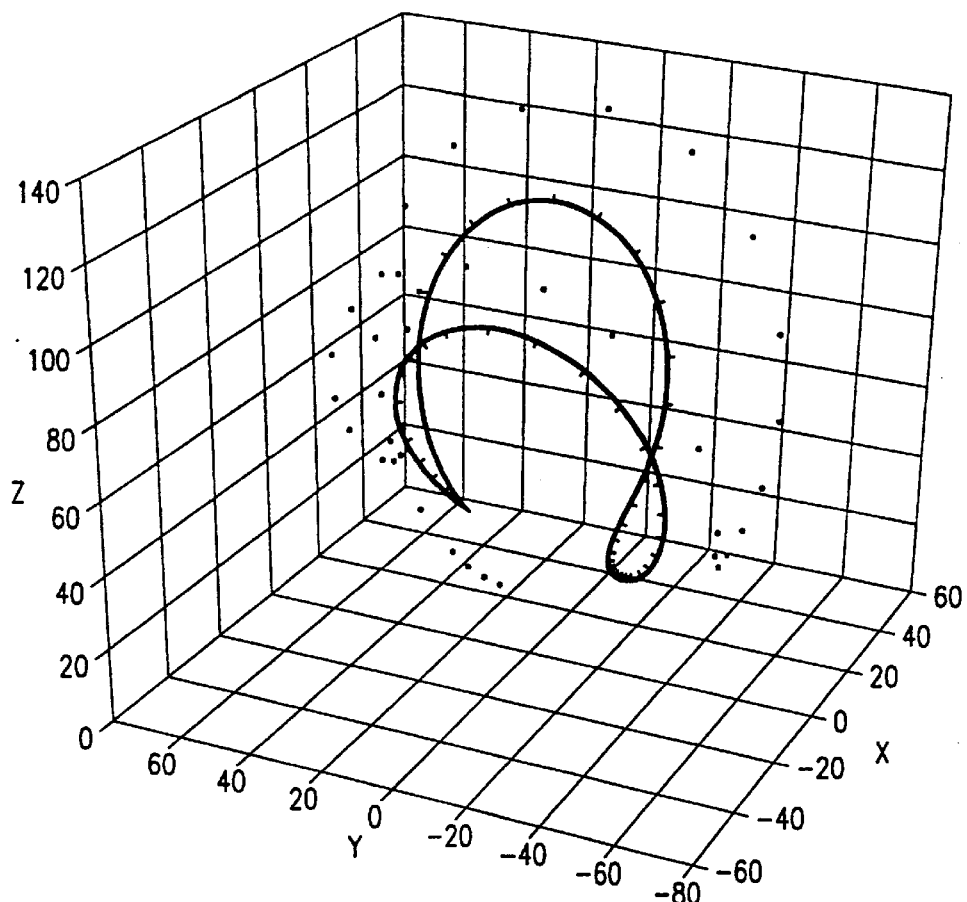
FIG. 5 shows the disclosed cryptographic system response settling into a single a predictable orbit.

The initial conditions making up the key space cannot be random but must be chosen from a limited number in order to generate satisfactory encryption streams. Depending on the initial conditions, the Lorentzian system can respond in one of four ways, only one of which is satisfactory. First, the system can "blow up"; that is, the x', y' and z' values very quickly go to positive or negative infinity. This response is useless for a cryptographic system because the encrypting cipher stream is too short. In a digital application, the result is that the dynamic variables will quickly generate a floating point error once the maximum value exceeds the maximum word size. Second, as shown in FIG. 4, the system can spiral into a single x, y, z point and then stabilize there. This is obviously undesirable for encryption because a repetitive byte is far from random, and therefore offers no encryption security. A third response, as shown in FIG. 5, is demonstrated where the system stabilizes in a predictable orbit. Such a periodic system is less useful for encryption because its periodicity is significantly shorter. The fourth possible response is a chaotic Lorentzian system with two attractors and otherwise random results, as shown in FIG. 1. This type of result is ideal for a cryptographic system. However, it is possible only when a specific set of initial conditions are satisfied.

The following ranges of initial conditions are used by one embodiment to achieve a satisfactory Lorentzian system:

| Dynamic Variables | Static Variables |
|---|---|
| x about −30 to about +50 | σ about .006 to about .028 |
| y about −30 to about +50 | r about 24 to about 40 |
| z about −30 to about +50 | b about 1 to about 8 | where x, y and z cannot be zero simultaneously.
These variable ranges provide initial conditions (or parameters) that result in chaotic behavior of the Lorentzian equations in approximately 60% of those cases tested when the variable values are carried out to fifteen significant figures.

In another embodiment, a narrowed range of initial conditions is used to achieve a satisfactory Lorentzian system.

| Dynamic Variables | Static Variables |
|---|---|
| x about −30 to about +50 | σ about .006 to about .0125 |
| y about −30 to about +50 | r about 24 to about 40 |
| z about +20 to about +50 | b about 2.5 to about 7 | where x, y and z cannot be zero simultaneously.
This range produces parameters which result in chaotic behavior of the Lorentzian equations of approximately 95% or better of all the sets of parameters possible.

These ranges define the ideal key space for the preferred embodiment of the present invention. The predetermination of the ideal keyspace reduces the number of invalid keys that will be located by sampling initial conditions and iterations. The ranges are approximate and it should be understood that different implementations or equations may require different ranges to achieve an ideal keyspace. Additionally, to assure that a set of initial conditions is a valid key, the key may be verified by sample iterations of the Lorenz equations to assure chaotic behavior.

The number of keys provided by the present invention is extremely large. The potential number of different keys is defined by the product of the ranges of the variables which make up the key space. Chaotic systems are extremely sensitive to initial conditions. A change in the 15th significant digit of any one variable in the key space is sufficient to generate a different random stream after a small number of iterations. Therefore, the number of possible keys in the key space of the present invention is determined by the product of the ranges of the six variables in the key space divided by the minimum increment ($1 \times 10^{-15}$) or approximately $1.2 \times 10^{96}$ different keys in the first embodiment and approximately $8.98 \times 10^{94}$ different keys in the second. This represents an extremely large key space that renders brute force attacks infeasible.

As an overview, the preferred embodiment implementing the cryptosystem of the present invention comprises a properly programmed computer system or microprocessor and a removable, electronic token. The electronic token is used to provide a secure storage area for the cryptographic key.

In order to access the cryptographic key to encrypt (or decrypt) a data file, three pieces of information must be present, a personal identification number (PIN) (memorized by the user and entered using the computer system keyboard), a cryptographic key serial number (stored in a memory partition in the removable electronic token) and a machine password (stored in the computer system or microprocessor). When the user wishes to encrypt a file, he attaches the token to the implementing processor via a connector and invokes the "encrypt" routine stored in the implementing processor.

The processor then combines the PIN, serial number and the machine password to compute a "read" password. The read password is then transmitted to the token which checks the validity of the read password, and then if valid, returns the cryptographic key stored in its memory.

In one embodiment, encrypting and decrypting data is started a predetermined number of iterations down the iterate streams produced by the Lorentzian equations. A pseudo random number is chosen to indicate how many iterations to run before beginning the encryption process. This number is then stored in the encrypted file as a header for later use to decrypt the encrypted file.

The implementing processor inputs the initial conditions into the Lorenz equations, iterates them the predefined number of times. The implementing processor then begins encrypting data with the iterate stream, by XOR-ing the data with the results of the Lorenz equations, a byte at a time. The "XOR" operation is the boolean logic exclusive "OR" operation. The XOR operation is well known in the art and will not be discussed further. The encrypted data is then stored or transmitted. Decryption is essentially the mathematical reverse of this process, using the same cryptographic key retrieved from the electronic token. However, the "file header" is read from the encrypted file and used to determine how many times to iterate the equations before beginning the decryption process.

In another embodiment, the Lorenz equations, once initialized are allowed to iterate infinitely without repeating from the first set of initial conditions each time. This is accomplished as follows: On encryption of the first data file, the implementing processor begins at the first set of initial conditions, encrypting a message byte by byte. At the end of the first message file, the ending variable values for the x, y, z, σ, r, and b parameters are stored in a file or back in the token, for future use. To encrypt a second message, the implementing processor adopts the stored values for the x, y, z, σ, r, and b parameters to be inserted into the Lorenz equations. The implementing processor then begins encryption of the next message using these parameter values.

The net result is that from message to message, the iterate stream from the first set of initial conditions continues infinitely, encrypting one message after another with the continuing iterate stream. Decryption is essentially the mathematical reverse of this process.

An advantage of the second embodiment is that the initial x, y, z, σ, r, and b parameter values, after used to start the generation of the iterate streams, may be erased from storage in the token, forever eliminating the possibility of discovery. In other words, after the iteration of the equations has begun, the original initial conditions, or original "cryptographic key" can be destroyed. Without this key, the past behavior of the equations, and the ability to regenerate it is lost.

The preferred embodiment allows several tokens to be used with an implementing processor, and several implementing processors to be activated with a single (or multiple) token(s). It also allows the user to install new tokens to be used for additional users. The invention provides for three classes of tokens, each having different capabilities, and different information stored in their memory partitions. A "super user class" is allowed to encrypt and decrypt data, and install new "user class" tokens; the "user class" can just encrypt and decrypt data; a "factory class" token is not allowed to encrypt or decrypt data or set up new user tokens, but does carry information necessary to the original installation of the entire cryptographic system.

In more detail, the preferred embodiment of the present invention is implemented using the architecture shown in FIG. 7. FIG. 7 shows an architecture 10 comprised of a master processor 12 and a slave processor 14. In the preferred embodiment, master processor 12 is an INTEL PENTIUM processor as used in common personal computers running in a DOS or Windows based environment. Other operating systems such as Unix can also be used with equal success. Of course, other microprocessors such as the MOTOROLA 68000 family, the INTEL 8088 family, INTEL IX86 family or RISC based microprocessors may be used with suitable results. The Motorola family is well known in the art and contains several discrete microprocessors such as part numbers 68020, 68030, 68040, and 68060. "Motorola Imaging systems Divisions Fact Sheet, Second Quarter 1998 SG17-D. Rev. 25 includes a listing of the Motorola Family of microprocessors". The Intel IX86 family of microprocessors is well known in the art and contains several discrete microprocessors such as 8086, 8088, 80386, 80486 Pentium and Pentium II. The data sheet printed from the Worldwide Web at address http://www.intel.com/intell/museum/25anniv/hof/hof/main.htm includes a listing of the Intel family of microprocessors. Additionally, discrete logic circuits or custom processor designs can be used to implement the necessary functions required to implement the necessary software steps. The internal architecture of the INTEL PENTIUM processor is well known in the art and will not be described further here.

Each token in the preferred embodiment incorporates a slave processor 14, shown in FIG. 7. Slave processor 14 consists of a comparator 16, I/O control circuitry 18 and a memory area 20. Slave processor 14 in the preferred embodiment provides for at least three separate memory partitions in memory area 20, each one of which is set to variable levels of accessibility. At least two partitions can be set to require passwords or not. If the memory partition is configured to require a "read" password, read access to the partition is only allowed when the "read" password is given. Similarly, if configured to require a "write" password, write access to each of the partitions will only be granted if the "write" password is supplied. If configured not to require passwords, slave processor 14 will allow read or write access to the memory partitions without the necessity of receiving a password. A "configuration" password, also stored in slave processor 14 allows the user to reprogram the read and write passwords.

In another embodiment, the slave processor may take the form of a memory location accessible to master processor 12 and controlled by a separate set of instructions executed by master processor 12 to release the contents of the memory location.

Slave processor 14 in the preferred embodiment is the XICOR X76041 password access security supervisor chip available from Xicor Incorporated located in Malipitas, Calif. The XICOR X76041 chip is a dedicated password access processor containing four byte-addressable 128 byte EEPROM arrays. Access to each array can be controlled by three 64 bit programmable passwords, one for read operations, one for write operations and one for device configuration. As configured in the present invention, access to the memory 20 is only allowed after communication of a valid password protocol as will be described more fully later. Other processors can be substituted for the XICOR X76041, including the INTEL, MOTOROLA or other microprocessors, custom processors or discrete logic components which are capable of performing the steps required.

In the preferred embodiment, slave processor 14 is connected to master processor 12 through a serial interface on a simple two-wire bus. The bus signals are a clock input (SCL) 22 and a bidirectional data input/output line (SDA) 24. In the preferred embodiment, power is supplied through a separate power bus 26. Physically, slave processor 14 is housed in a separate plastic package which is attachable to master processor 12 through a standard four pin connector (not shown). The four pin connector provides connections for the SCL line 22, the SDA 24, and power and ground lines for power bus 26. Either means of data communication such as the infrared data access ports may be used with equal success.

Architecture 10 also includes, inbound memory 28, outbound memory 30 and program memory 37. In the preferred embodiment, memories 28, 30 and 37 are storage media such as a random access memory (RAM), read-only-memory (ROM), fixed disks or floppy disks. However, any equivalent storage device, such as optical medium, buffers or magnetic tape can also be used. Additionally, inbound memory 28 and outbound memory 30 can be replaced by an input/output (I/O) port addressable by master processor 12 for real time receipt and transmission of data. This feature is useful in applications where encryption and decryption of data is necessary on a real time basis, without storage.

Architecture 10 also includes an input port 32, a machine password memory 34, read only memory (ROM) 36, and a video display device 38. In the preferred embodiment, input port 32 has a standard PC keyboard. However, input port 32 can be any number of I/O devices such as key pads, magnetic card readers or optical scanners.

Machine password memory 34 in the preferred embodiment is a hard disk. However, memory 34 can also take other forms of non-volatile memory such as ROM or battery backed-up RAM, floppy disks, optical disks, or magnetic tape storage. ROM 36 is provided in architecture 10 to allow booting of master processor 12. ROM 36 may also contain the necessary software routines to implement the invention which can be loaded at start-up of master processor 12 or vectored to locations in program memory 37 which contain the necessary routines which can be accessed at run time.

Inbound memory 28, input port 32, machine password memory 34, outbound memory 30, ROM 36 and program memory 37 are all connected to master processor 12 via address bus 39 and data bus 40. Details of addressing modes and data transmission in computer systems are well known in the art will not be further described.

Power supply 42 supplies operating voltage to both master processor 12 and slave processor 14 via power bus 44 and 26, respectively. The attributes of the power bus and supply are well known in the art and will not be further described.

To install the preferred embodiment of present invention, a user receives two new "factory" tokens and essential software routines on a portable disk. The user supplies necessary information such as the personal identification number and machine password which allows the installation routine to program "user" tokens and "super user" tokens. After being initially configured, the tokens are ready to be used to encrypt and decrypt data.

FIGS. 8a, 8b and 8c are graphical representations of three memory models of slave processor 14. The first row of each model depicts the level of access allowed to the data stored in each memory partition. The second row depicts the password requirement for access to the data stored in each partition. The third row represents the data stored in each partition. The fourth row represents the address of each kilobits of data stored. The rightmost column of each model represents the first kilobit memory partition of the slave processor. The center column represents the second kilobit memory partition. The leftmost column represents the memory partition allocated for storage of the slave processor 14 control passwords.

More specifically, FIG. 8a is a graphic representation of a memory model of slave processor 14 configured to act as a "user" token. As can be seen, both the first 1024 bits, or 128 bytes, hex address 000 through 078 (the "First K"), and the second 1024 bits, or 128 bytes, hex address 080 through 0FF (the "Second K"), are set to allow read access only, as shown at 80 and 81. The password requirement of the First K partition, shown at 82, is set not to require a "read" password for access to the information in the first partition. The password requirement of the Second K partition is set to require a "read" password to allow read functions, shown at 83. In the data area of the First K partition, the token serial number is stored. In the preferred embodiment, each token is individually serialized with an eight byte serial number shown at 84. The initial conditions for the Lorenz equations are stored in the Second K memory partition shown at 85. Slave processor 14 also includes an access password memory shown as 86, 87 and 88. At memory area 86, the 8 byte "read" password is stored, the 8 byte "write" password is stored at memory area 87, and an 8 byte "configuration" password is stored at memory area 88. Preferably, slave processor 14 does not allow any read access of memory areas 86, 87 and 88.

FIG. 8b is a graphic representation of a memory model of slave processor 14 configured to act as a "super user" token. As can be seen, both the First K, the Second K partitions are set to allow read access only, as shown at 95 and 96. The password requirement of the First K memory partition, shown at 97, is set not to require a read password for access to the information in the first partition. The password requirement of the Second K memory partition is set to require a read password to allow read functions, as shown at 98. The "super user" token serial number is stored in the First K memory partition, as shown at 99. The initial conditions are stored along with the "configuration" password in the Second K memory partition, as shown at 100. The access password memory partition shown as 101, 102, and 103 holds respectively, a "read" password, a "write" password, and a "configuration" password, each 8 bytes in length. It is necessary to store the configuration password at memory area 100 in addition to memory area 103, because memory area 103 is restricted. In order to configure other tokens, the configuration password, shown at 103, must be accessible. By storing the configuration password in memory area 100, it is available for programming new tokens.

FIG. 8c is a representation of a memory model of a slave processor 14 configured to act as a "factory" token. As can be seen, the First K and Second K memory partitions are set to allow read access only, shown at 89 and 90. The password requirement of the First K memory partition, shown at 91 is set to not require a "read" password for access to the information in the first partition. The password requirement of the Second K memory partition is also set not to require a "read" password to allow access, as shown at 92. At the data area of the First K partition, the token serial number is stored, along with an original configuration password, set to "0000000", shown at 93. In the data area of the Second K partition, shown at 94, the initial conditions for the Lorenz equations are stored. The configuration password is stored in the token's access password memory partition 104 as "0000000". It is necessary to store the configuration password of the factory token twice so that when the factory token is reprogrammed by the system user, the token's access and function levels can be configured appropriately. Further description of the memory partitions and programming details of the XXICOR X7041 chip are well known in the art and will not be further described here. The disclosure in *XICOR Application Note and Development System AN67.XK76*, "Password Access Security Supervisor-4K-X76041-4×128×8 Bit", Pass™E$^2$, release date Jun. 1, 1995 is incorporated herein by reference.

In the preferred embodiment, each parameter of the initial conditions is required to be calculated to 15 significant figures. Parameters with resolution to 15 significant figures provide sufficient resolution to achieve a large number of keys available in the valid key space. To achieve 15 significant figures, each parameter must use at least eight bytes of memory. Each parameter is stored in standard IEEE format, with the left-most bit being the sign bit of the parameter, the following eleven most significant bits being the number of the exponent, and the following fifty-two bits forming the value of the parameter. Of course, other data structures can be used equally as well.

Figure 9:
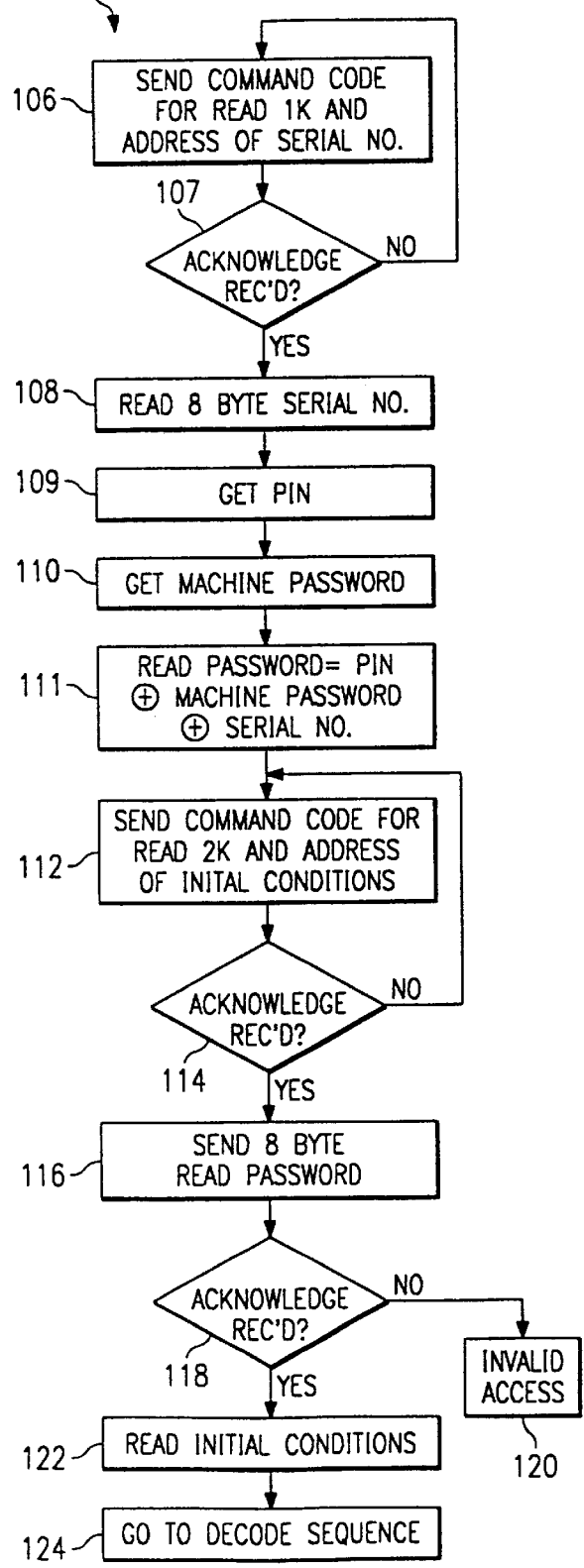
FIG. 9 shows a flow chart of the program employed by the preferred embodiment to gain access to the initial conditions stored in the disclosed slave processor.

In order to gain access to the initial conditions stored in slave processor 14, the master processor 12 in the preferred embodiment executes the software routine 105 shown in FIG. 9. First, at step 106, master processor 12 sends slave processor 14 the appropriate command sequence telling slave processor 14 that a read operation is requested, and an address in memory area 20 to read the serial number stored in the first memory partition, 84. All communication takes place serially over SDA line 24, moderated by a clock signal generated by master processor 12 and transmitted over SCL line 22. If an acknowledge signal is received from slave processor 14 at step 107 by master processor 12, then, master processor 12 reads the eight byte serial number via SDA line 24 and stores it in temporary memory, as shown at step 108. If no acknowledge signal is received at step 107, then master processor 12 repeats the send command step 106. This cycle repeats until an acknowledge is received by master processor 12 or time out condition is reached (not shown).

Next, master processor 12 executes step 109 by querying the user, via video display 38, to input the PIN number. The user inputs the personal identification number (PIN) using the keyboard on input port 32 to the master processor 12. At step 110, master processor 12 polls machine password memory 34 and receives the machine password assigned to it during installation of the system, which will be further described later. Master processor 12 then executes step 111 wherein the PIN, machine password and the serial number are XOR-ed together to compute a "read" password; the "read" password is stored in temporary memory. At step 112, master processor 12 sends the command code for read, along with the address of the initial conditions stored in slave processor 14, in order to initiate a read of the initial conditions stored in the Second K memory partition of slave processor 14, shown at 85 in FIG. 8. Master processor 12 then waits at step 114 for an acknowledge signal to be received from slave processor 14. Upon receipt of the acknowledge signal at step 114, master processor 12 moves to step 116 and clocks out the eight byte "read" password on SDA line 24 to slave processor 14 at step 116. Master processor 12 then waits to receive an acknowledge signal from slave processor 14 indicating that the "read" password has been received and matches the access "read" password stored in slave processor 14. However, before slave processor 14 generates this acknowledge signal, it must execute a verification protocol to identify the "read" password sent by master processor 12.

Figure 10:
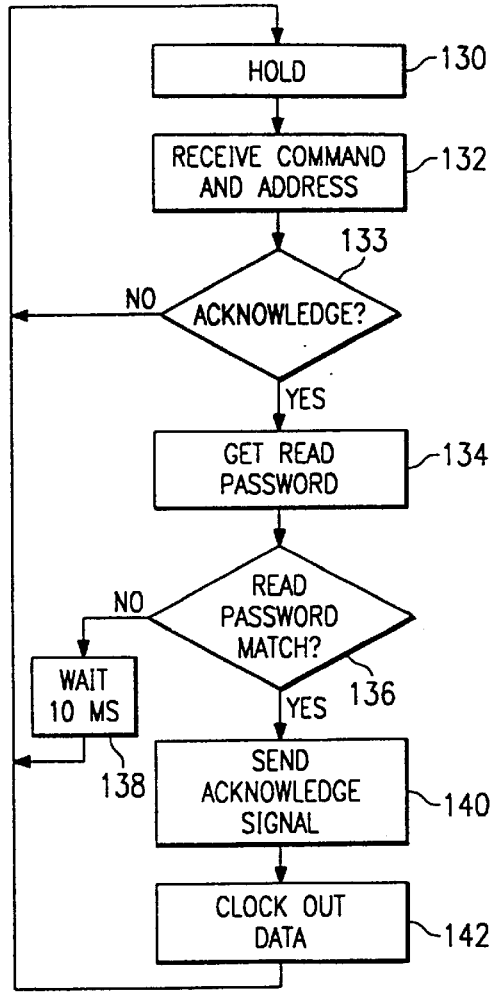
FIG. 10 shows a flow chart of the software executed by the preferred embodiment to verify protocol.

The protocol verification routine is shown at FIG. 10. Slave processor 14 is found in a hold state at 130. Upon receiving the read command, and the address of the data to be read at step 132, slave processor 14 responds by sending an acknowledge signal at step 133. If the command data is not properly received by slave processor 14, no acknowledge signal is sent, and slave processor returns to the hold state, 130. Assuming correct transmission of data and sending of the acknowledge signal in step 133, slave processor 14 moves to step 134 where it clocks in the "read" password from SDA Line 24. The "read" password is then compared, via comparator 16 of slave processor 14 to the access "read" password stored in password memory area 86 of slave processor 14, shown in FIG. 8. If the read passwords match, then an acknowledge signal is sent from slave processor 14 to master processor 12 at step 140. If the passwords do not match, slave processor 14 waits ten milliseconds at step 138, and then returns to the hold state 130. Step 138 is included to frustrate brute force electronic attacks, that is simply trying each possible "read" password until slave processor 14 allows access to the initial conditions. With a "read" password length of eight bytes and a wait state of ten milliseconds at step 138, it would take approximately 5.8 billion years to check each password possibility. After sending the acknowledge signal, slave processor 14 then clocks out the initial conditions stored in Second K memory partition 85 in FIG. 8 to the master processor 12.

Returning to FIG. 9, if no acknowledge is received, at step 118, master processor 12 reports an invalid access attempt at step 120. If a valid acknowledge signal is received at step 118, master processor 12 reads the initial conditions from slave processor 14 on SDA line 24 at step 122. Once master processor 12 has the initial conditions, it proceeds to step 124 where it can proceed to the encode or decode sequence shown at FIGS. 11 and 12 or FIGS. 15 and 16.

In one embodiment, master processor 12 encrypts data by executing the program depicted in FIG. 11. At step 150, master processor 12 generates a pseudo random number, 2 bytes in length, from any number of pseudo random functions available, and stores it in temporary memory. At step 152, master processor 12 executes routine 105, shown in FIG. 9, to obtain the initial conditions x, y, z, $\sigma$, r and b. At step 158, the pseudo random number derived in step 150 is written to the encrypted file as the first several bytes or as a file header. The pseudo random number generated is different for each file encrypted. The number generated in step 150 indicates how far down the iterate stream, produced by the Lorenzian equations, the processor is allowed to run before beginning the actual encryption of data. Because each file is encrypted beginning at a different point down the iterate stream, each encrypted file is different, even if the files to be encrypted and the initial conditions are the same. This aspect of the current invention thereby frustrates chosen plain text attacks. As will be described later, the pseudo random number is also used by the decryption sequence to indicate how long to iterate the Lorenz equations before beginning decryption.

The Lorenz equations are iterated at step 159. At step 160, master processor 12 polls inbound memory 28 to get a byte of the data file to be encrypted. At step 162, this byte of data is then XOR-ed with a preselected byte of the z' iterate stream. In the preferred embodiment, the data is XOR-ed with the 4th byte of the data value produced by the z' iterate stream. The advantage of using the boolean exclusive-or (XOR) operation is that it is a reversible operation. That is, a byte of data encrypted with a byte of the iterate stream may be decrypted by XOR-ing the encrypted data with the same byte from the same iterate stream.

Of course, any byte of the x', y' or z' streams may be used to encrypt data. Additionally, in an alternate embodiment (not shown), bytes from each of the x', y' and z' iterate streams may be XOR-ed together to create the cipher byte. Alternatively, bytes from the x', y' and z' iterate streams may each be used as separate ciphers to encrypt data. As a result, three message bytes are encrypted per iteration, thus effectively tripling the process speed.

In another embodiment (not shown), the output results of the Lorenzian equations, x', y' and z', may be used to vary the values of the σ, r and b parameters. These parameters have been previously described as being "static" in that they are not changed on each iteration of the equations. However, the data from the x', y' and z' iterate streams may be used to alter the σ, r and b parameters on each iteration, so that they are no longer "static." For example, bytes from the x', y' and z' iterate streams can be chosen or combined to create new a, r and b parameter values on each iteration. The advantage of this embodiment is that it would be more difficult for a potential attacker to determine the cryptographic key to decrypt the message.

At step 164, the encrypted message is written to a temporary file. At step 166, master processor 12 checks to determine if the last byte of data to be encrypted has been read from inbound memory 28. If it has, the entire encrypted file is written to outbound memory 30 at step 168 and the encrypt sequence is terminated at step 170; if not, master processor 12 returns to step 159 to reiterate the Lorenz equations and encrypt the next data byte..

Figures 15, 16:
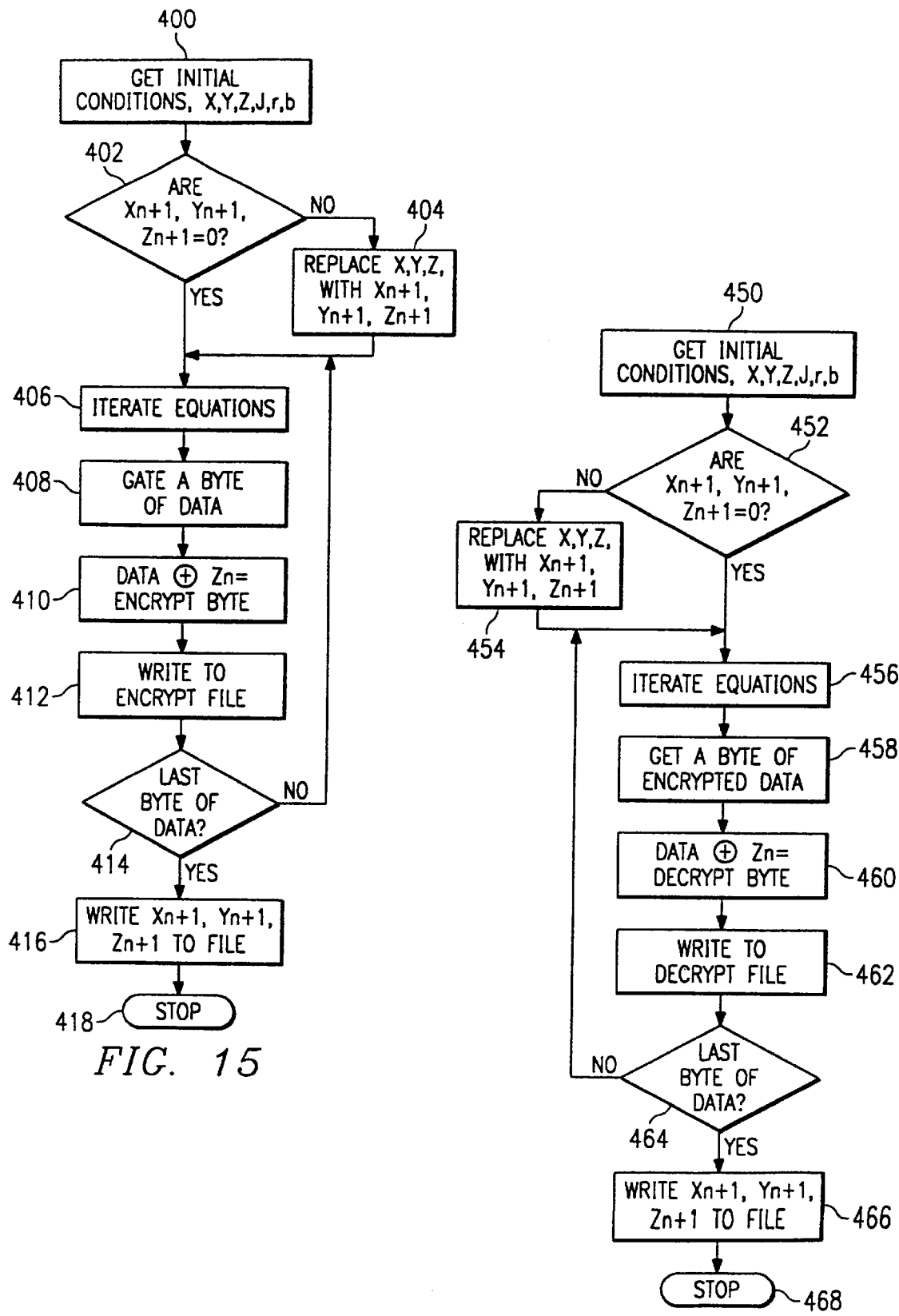
FIG. 15 shows a flow chart of an alternate embodiment of the software used by the invention to encrypt data.
FIG. 16 shows a flow chart of an alternate embodiment of the software used by the invention to decrypt data.

In a second embodiment, master processor 12 encrypts data by executing the program depicted in FIG. 15. This embodiment, differs from the prior embodiment in that encryption begins at the first iteration of the Lorenz equations. Instead of beginning encryption a predetermined number of iterations down the stream, but restarting the streams upon each use of the encryption routine, the second embodiment never restarts the iterate streams from the original initial conditions, but rather allows the equation iterations continue uninterrupted, from one message to the next. Essentially, the encryption of each new message begins where the encryption of the prior message stopped.

Referring to FIG. 15 at step 400, master processor 12 executes routine 105, shown in FIG. 9, to obtain the initial conditions x, y, z, σ, r and b. At step 402, master processor 12 checks an on board file (preferably secured from unauthorized access), containing $x_{(n+1)}$, $y_{(n+1)}$, and $z_{(n+1)}$ from the prior encryption session. This file contains the last value of $x_{(n+1)}$, $y_{(n+1)}$, and $z_{(n+1)}$ from the Lorenz equation iterations. If the equations are being iterated for the first time, the values of $x_{(n+1)}$, $y_{(n+1)}$, and $z_{(n+1)}$ will be zero. In this event, at step 402, master processor 12 proceeds to step 406, where the Lorenz equations are iterated and new values for $x_{(n+1)}$, $y_{(n+1)}$ and $z_{(n+1)}$ are generated. If the program has been used previously, master processor 12 proceeds to step 404, and replaces the initial conditions x, y and z received at step 400 with the values of $x_{(n+1)}$, $y_{(n+1)}$ and $z_{(n+1)}$ stored in the file. Master processor 12 then proceeds to step 406 and iterates the Lorenz equations beginning with the initial condition $x_{(n+1)}$, $y_{(n+1)}$, and $z_{(n+1)}$, σ, r and b.

At step 408, master processor 12 polls inbound memory 28 to get a byte of the data file to be encrypted. At step 162, this byte of data is then XOR-ed with the fourth byte of the z' iterate stream to generate an encrypted byte. At step 412 this encrypted byte is written to a temporary file.

At step 414, master processor 12 checks to determine if the last byte of data to be encrypted has been read. If not, it returns to step 406 where the Lorenz equations are iterated again to determine a new $x_{(n+1)}$, $y_{(n+1)}$ and $z_{(n+1)}$; if the last byte of data has been read, master processor 12 writes the current $x_{(n+1)}$, $y_{(n+1)}$ and $z_{(n+1)}$ values to a file at step 416 and ends the encryption routine at step 418.

The decryption routine of the first embodiment to decode encrypted messages, shown in FIG. 12, is similar but not identical to the encryption routine shown in FIG. 11. At step 190, master processor 12 polls inbound memory 28, which now holds an encrypted file, and reads the pseudo random number stored in the file header at step 158 of FIG. 11. At step 192, the processor then invokes the initial condition routine 105 to get the initial conditions stored in memory 20 of slave processor 14. At step 194, the initial conditions are substituted into the Lorenz equations and iterated the number of times indicated by the pseudo random number. Master processor 12 then proceeds to step 204, where it retrieves a byte of encrypted data from inbound memory 28 (now containing encrypted data). The equations are iterated again at step 205 to generate another byte of cipher text. At step 206, first byte of encrypted data is XOR-ed with the fourth byte of the z' iteration stream . Step 206 results in decrypting the byte of encrypted data. The decrypted byte is then written to the outbound memory 30, at step 208. At step 210, the processor checks inbound memory 28 to determine if all data has been decrypted. If not, master processor 12 returns to step 204 to retrieve another byte of encrypted data from inbound memory 28 then the Lorenz equations are iterated again at step 212. If the last byte of data has been retrieved and decrypted at step 210, master processor 12 ends execution at step 214.

The decryption routine of the second embodiment to decode encryption messages, shown in FIG. 16, is similar to but not identical to the encryption routine shown in FIG. 15. The decryption routine of the second embodiment also keeps track of how many iterations down the iterate stream are required for each message, beginning decryption for each successive message at the iteration stream termination point from the prior message. More specifically, at step 450, master processor 12 invokes initial condition routine 105 to obtain the initial conditions stored in memory partition 20 of slave processor 14. At step 152, the previous values of $x_{(n+1)}$, $y_{(n+1)}$ and $z_{(n+1)}$ are retrieved and checked to see they are all zero. If they are, the program assumes that it is the first time decryption has been requested and iterates the Lorenz equations to generate values of $x_{(n+1)}$, $y_{(n+1)}$, and $z_{(n+1)}$. If not, at step 454, master processor 12 replaces the initial conditions x, y and z retrieved at step 450 with the initial conditions $x_{(n+1)}$, $y_{(n+1)}$ and $z_{(n+1)}$ retrieved from a file where they were stored at the end of the last decryption, and then proceeds to step 456 to iterate the Lorenz equations.

At step 458, master processor 12 polls inbound memory 28 to get a byte of the data file to be decrypted. At step 460, this data is XOR-ed with the fourth byte of the z' iterate stream to produce a decrypted byte. At step 462, this decrypted byte is written to a temporary file. Master processor then checks to see if the last byte of data has been decrypted at step 464. If it has not, the processor returns to step 456, to reiterate the Lorenz equations. If it is, processor moves to step 466 where the current values of $x_{(n+1)}$, $y_{(n+1)}$ and $z_{(n+1)}$ are written to a file, along with the σ, r and b parameter values, to be used as initial conditions to begin the next encryption. Execution terminates at step 468.

The preferred embodiment of the invention allows for several different slave processors to be used in conjunction with the same master processor, or different master processors. In the preferred embodiment, the slave processor is used as a "token" and is wholly portable from the master processor. Additionally, in conditions where less stringent physical security is required, slave processor 14 can be incorporated as a nonremovable partition in master processor 12 or exclusively in software executed within master processor 12. In this case, the functions of slave processor 14 can be carried out from within master processor 12 itself, or can collapse into a simple password requirement. Other tokens can be used equally well in these applications, such as magnetically encoded cards, bar codes or other memory storage devices.

Figure 13A:
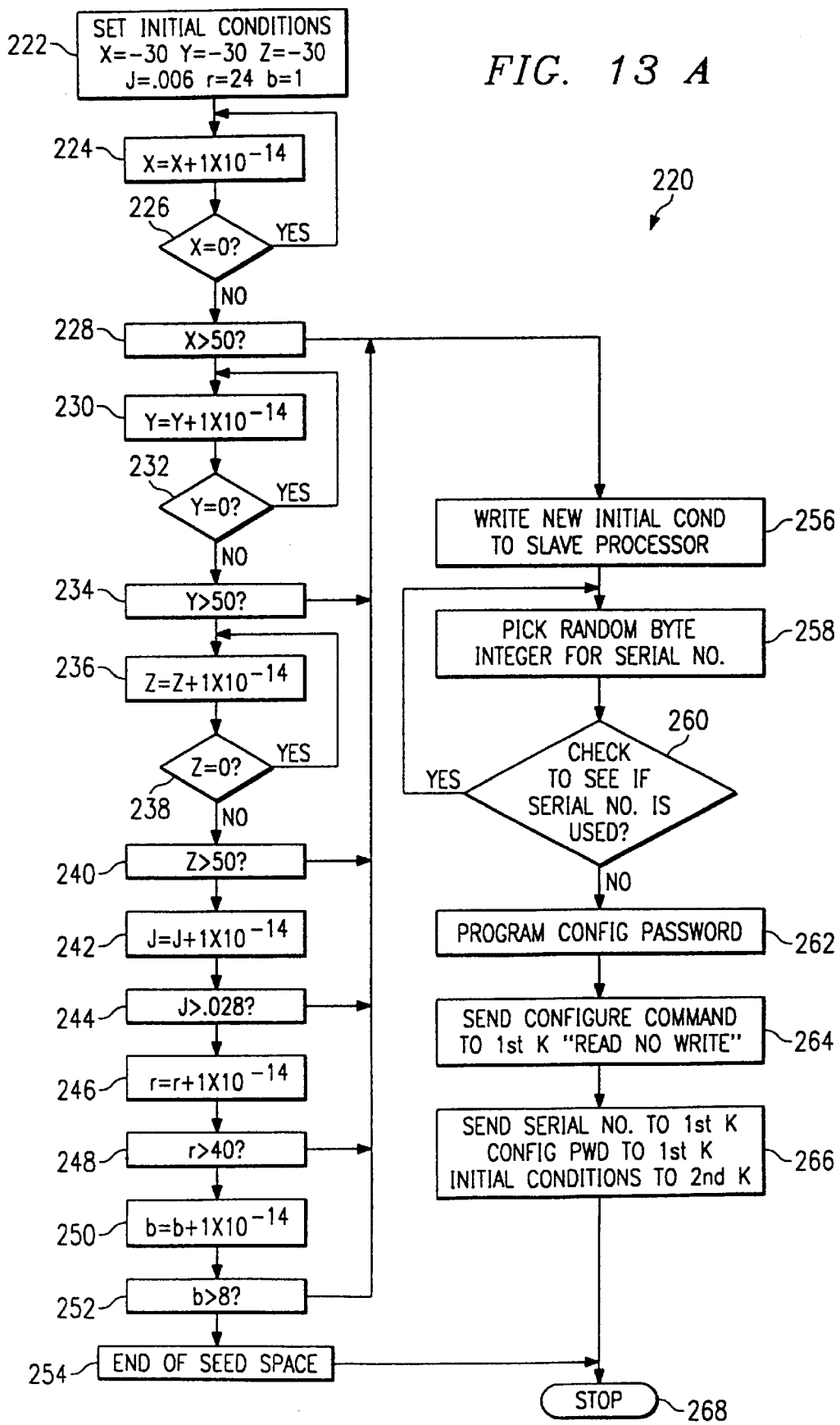
FIG. 13a shows a flow chart of the software executed by the preferred embodiment to preprogram the disclosed slave processor.

In the preferred embodiment, each slave processor 14 is preprogrammed before it is received by the user. Preprogramming routine 220 is shown in FIG. 13a. In order to preprogram each slave processor 14, master processor 12 proceeds sequentially through the ideal key space, assigning each slave processor a unique set of initial conditions, and serial numbers. The assignment of initial conditions may be random or sequential to ensure complete usage of the valid key space. Additionally, the access configuration password may be set to all 0's for each token, so that it can be read and reprogrammed upon receipt by the user.

In more detail, at step 222, master processor 12 sets the initial values for the initial conditions as x=y=z=−30, σ=0.006, r=24, and b=1. At steps 224, 226 and 228, master processor 12 increments the x parameter and checks to see if it is valid and within range. If it is, master processor 12 moves to step 255. The new initial conditions then consist of the current incremented value of x and the initial values of y, z, σ, r and b. If the x parameter is out of range, the processor moves to step 230, 232, and 234 where the y parameter is incremented, and checked to see if it is valid and within range. If it is, master processor 12 proceeds to step 255. The new initial conditions then consist of the current incremented value of y, the last valid value of x and the initial values of z, σ, r and b. If the y parameter is out of range, Processor 12 moves to steps 236, 238 and 240 where the z parameter is incremented, and checked to see if it is valid and within range. If it is, master processor 12 moves to step 255. If it is not, master processor 12 moves to steps 242 and 244 where the a parameter is incremented and checked to see if it is within range. If it is, master processor 12 moves to step 255. If it is not, master processor 14 moves to steps 246 and 248 where the r parameter is incremented and checked to see if it is in range. If it is, master processor 12 moves to step 255. If it is not, master processor 14 moves to steps 250, where the b parameter is incremented and checked to see if it is within range. If it is, master processor 12 moves to step 255.

At step 255, master processor 12 iterates the equations using the current initial conditions; that is, the current values of x, y, z, σ, r and b. At step 256, master processor 12 determines if the equation's behavior is suitable for cryptographic system, that is, a system that demonstrates chaotic behavior.

In the preferred embodiment, chaotic behavior is tested by searching for a unbounded result, a singular result or a periodic result over a large number of cycles. However, other tests for chaotic behavior, such as statistical analysis or other mathematical tests may be used with equal success. For example, the chi-squared test or tests of the Lyapunov exponents may be used to determine if the results of the equations are exhibiting random or chaotic behavior. These test are well known in the art and will not be discussed further.

If chaotic behavior is established, master processor 12 moves to step 257 where the new initial conditions are written to slave processor 14 via SDA line 24. If it is not, master processor 12 moves to step 254 reaching the end of the ideal key space and terminating operation at step 268.

Figure 13B:
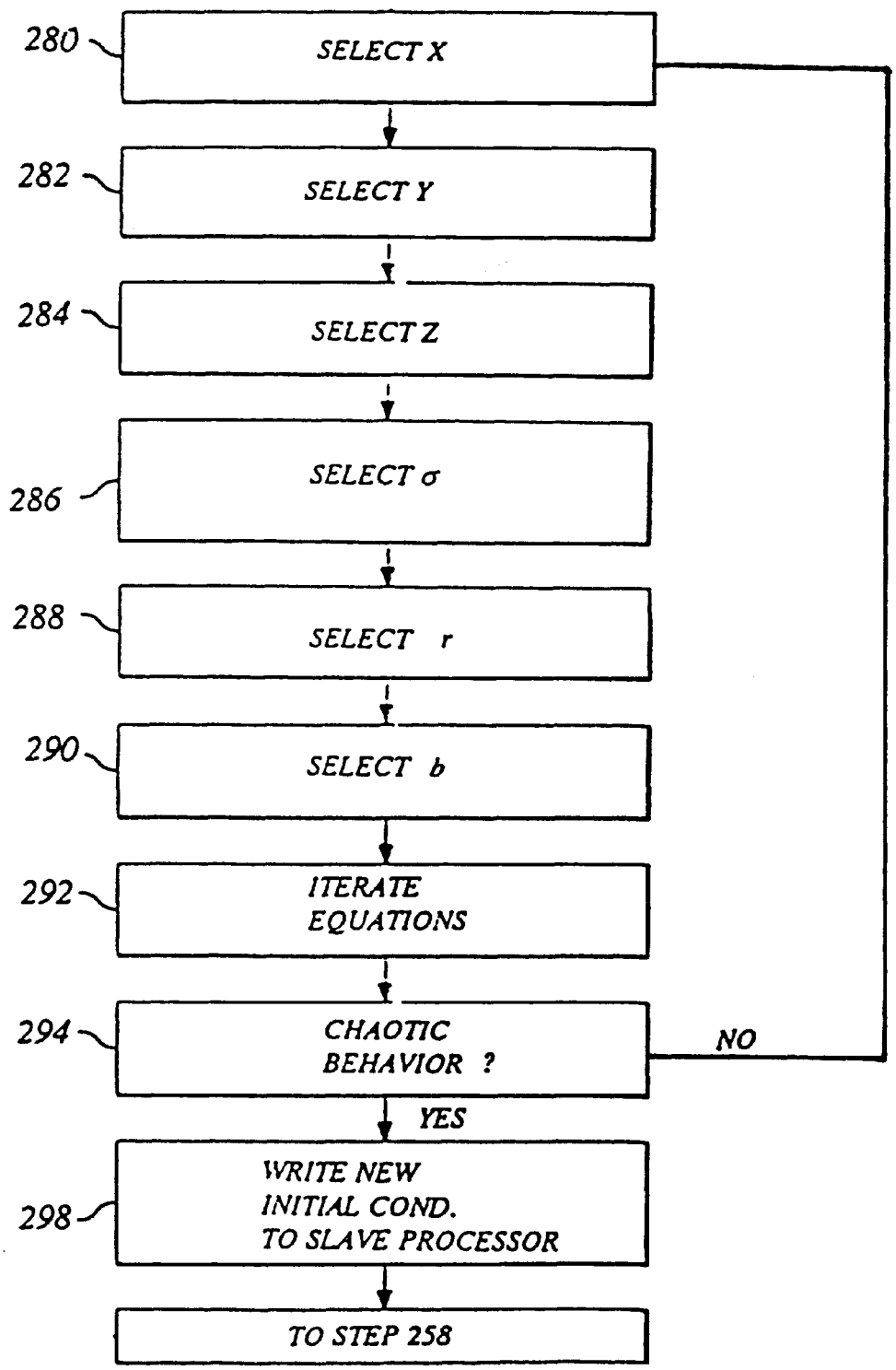
FIG. 13b shows an alternate embodiment of the software executed by the preferred embodiment to preprogram the disclosed slave processor.

In another embodiment, steps 222–256 may be replaced by steps 280–298 as shown in FIG. 13b. In this embodiment, instead of processing through the ideal keyspace incrementally, any set of parameters is chosen within the ideal keyspace and is then tested through iteration of the equations to ensure chaotic behavior. More specifically, at step 280 an x is chosen within the specified range. Similarly, at step 282, a y is chosen within its specified range. At step 284, a z is chosen within the specified range, at step 286 an a chosen within its specified range, at step 288 an r within its specified range, and at step 290 a b is chosen within its specified range. At step 292, the equations are iterated given the selected set of parameters a predetermined number of times.

At step 294, chaotic behavior of the equations is checked by checking for an unbounded result, a single result or a periodic result. In other embodiments, chaotic behavior may be checked through various statistical means or other mathematical tests which will reveal the chaotic nature of the system. If behavior of the equations is not chaotic, master processor 12 returns to step 280 to begin the selection of parameters again. If chaotic behavior is determined, master processor 12 moves to step 298 which is analogous to step 256 as shown on FIG. 13a.

Returning to FIG. 13a, assuming that a valid set of initial conditions has been written to slave processor 14, master processor 12 moves to step 258 where it derives a pseudo random 8 byte integer as the slave processor's serial number. The serial number may be generated using a transform of the x, y and z parameters. At step 260, master processor 12 polls inbound memory 28, (which now holds a data file of previously used serial numbers and initial conditions), to determine if the serial number has been used previously. If it has, master processor 12 loops back to step 258 to pick or generate a different 8 byte serial number. If it has not been used, master processor 12 moves to step 262 where it sets the "configuration" password of slave processor 14 to all zeros. At step 264, slave processor 14 is configured to allow access to the First K and Second K memory partitions without a "read" password. At step 266, master processor 12 writes the serial number and the "configuration" password to the First K memory partition and the new initial conditions to the Second K memory partition in slave processor 14. The routine concludes at step 268.

At this point, a "factory class" token containing the slave processor 14 has been programmed and allows free access to its memory, now containing the token serial number, configuration password, and the initial conditions. However, before the new token can be used in the preferred embodiment, it must be set up as shown in FIGS. 8a or 8b, thereby customizing slave processor 14 to include the new "read" password formed from the personal identification number, the machine password and the token serial number. This is accomplished through the set up routine as shown in FIG. 14.

Figure 14:
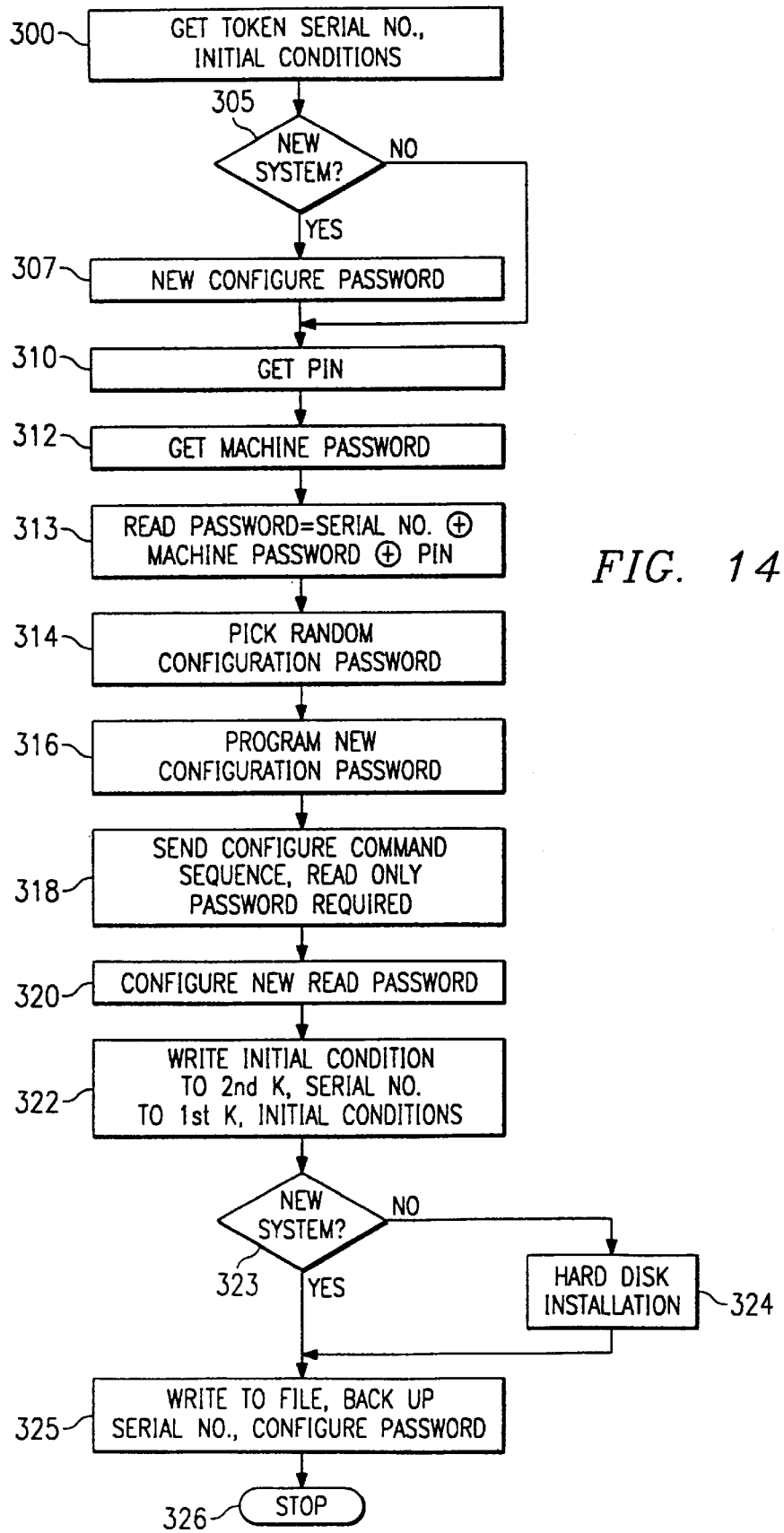
FIG. 14 shows a flow chart of the software executed by the preferred embodiment to program the disclosed slave processor by a user.

Moving to FIG. 14, at step 300, master processor 12 is connected to the "factory class" tokens as previously programmed, freely retrieving the token serial number, and the initial conditions stored in slave processor 14. At step 305, master processor 12 queries the user, via video display 38, if the installation is of a new system, receiving a "yes" or "no" answer from input port 32. If the answer is no, master processor 12 skips to step 310. If the answer is yes, master processor 12 executes step 307 to get the "configuration" password and proceeds to step 310. At step 310, master processor then queries the user, via video display 38, to input his personal identification number using input port 32. This number is stored in temporary memory. Once received, master processor 12 again queries the user to input an 8 byte machine password using input port 32. In step 312, this machine password is stored in machine password memory 34. In step 312, the machine password may also be generated using a pseudo random number generator. Moving to step 313, the token serial number, the machine password, and the personal identification number are XOR-ed together to derive the "read" password. At step 314, an 8 byte pseudo random number is chosen to be used as the "configuration" password. At step 316, this new "configuration" password is sent to slave processor 14 and stored as its new "configuration" password. At step 318, the new configuration password is used to send a command sequence to set up the function and access levels of the memory partitions of slave processor 14, as shown in FIGS. 8*a* or 8*b*. In step 320, the new read password is sent to slave processor 14, to reside in memory in slave processor 14 as shown in FIGS. 8*a* or 8*b*. At step 322, the initial conditions are written to the Second K memory partition, as shown in FIG. 8*a* to create a "user" token as shown in FIG. 8*a*, or, alternatively, the initial conditions and the new "configuration" password are written to the Second K memory partition as shown in FIG. 8*b*, to create a "super user" token. In step 323, if the result of step 305 was no, master processor executes set up routine 324. In step 324, master processor 12 writes the encryption routine shown in FIG. 11 or FIG. 15, the decryption routine shown in FIG. 12 or FIG. 16, and the set up routine shown in FIG. 14 to program memory 37. If the result of step 305 was yes, master processor skips to step 325. In step 325, master processor 12 writes the token serial number and "configuration" password to outbound memory 30 as a backup for future use. The routine then ends at step 326.

Figure 6A:
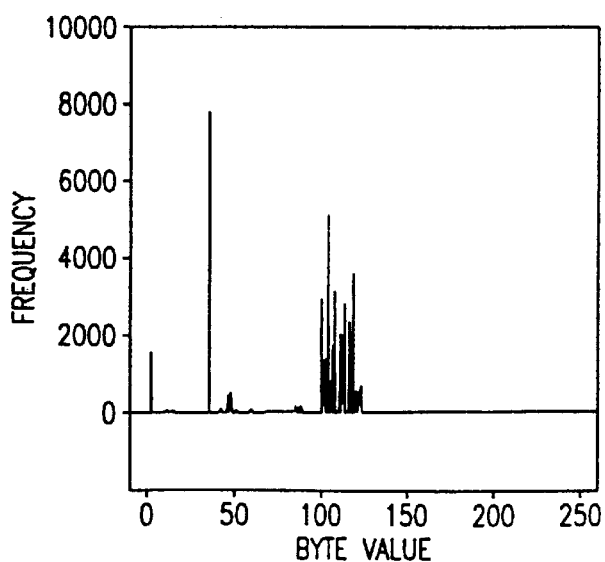
FIG. 6a shows an unencrypted spectral distribution of a MICROSOFT WORD document file.
Figure 6B:
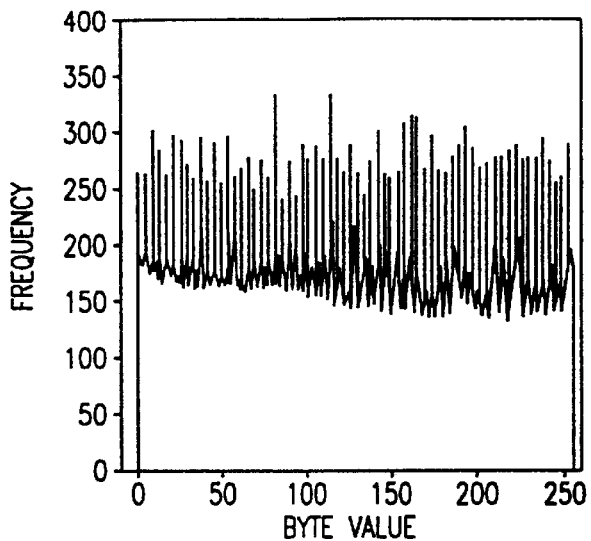
FIG. 6b shows the spectral distribution of a MICROSOFT WORD document file after being encrypted with the DES encryption standard.
Figure 6C:
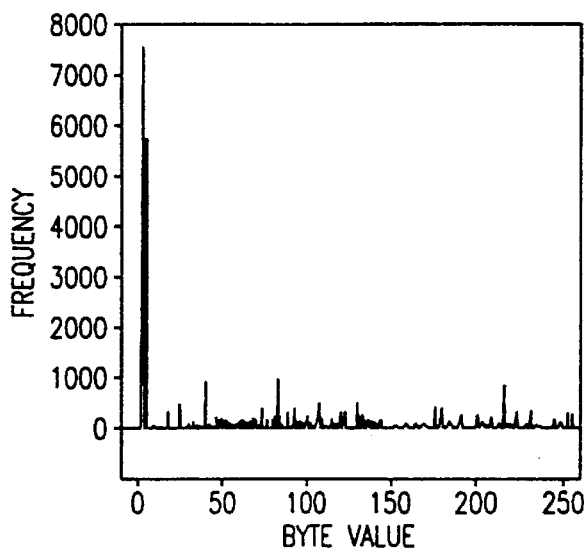
FIG. 6c shows the spectral distribution of a MICROSOFT WORD document file after being encrypted with the RSA encryption standard.
Figure 6D:
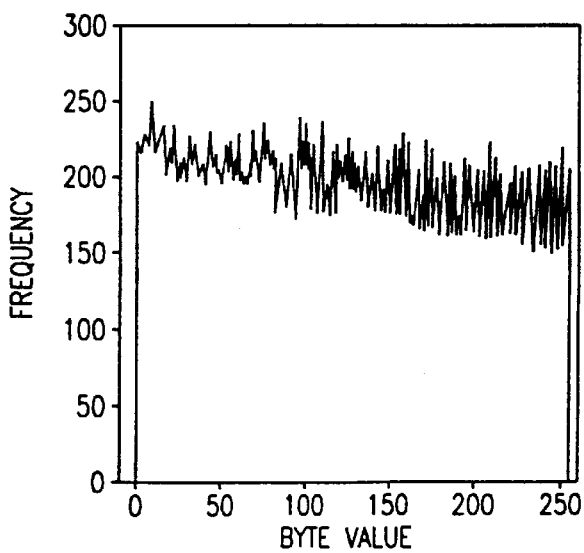
FIG. 6d shows the spectral distribution of a MICROSOFT WORD document file after being encrypted with the cryptosystem defined by the preferred embodiment of the present invention.

The effectiveness of the algorithm in altering the spectral distribution of a typical word processor document is illustrated in FIGS. 6*a* through 6*d*. FIG. 6*a* shows an unencrypted spectral distribution of a MICROSOFT WORD document file. FIG. 6*b* shows the file after being encrypted with the DES encryption standard. A notable DES signature is present through the repetitive peaks and valleys obvious throughout the encrypted file. FIG. 6*c* shows the same MICROSOFT WORD document file encrypted using the RSA encryption standard. Again, the RSA system leaves a characteristic signature showing evidence of the original ASCII and blank characters being heavily weighted in the original spectrum. FIG. 6*d* shows the MICROSOFT WORD document file encrypted using cryptosystem defined by the present invention. It can be seen that there is no information left in the ciphertext that could be used to reveal the methodology of encryption or the original message spectrum.

The speed of the encryption system in the present invention was also compared to the DES and RSA standards on a INTEL PENTIUM personal computer. All three algorithms were implemented using the TURBO C program and a 1.3 megabyte file. The RSA implementation for the 200 digit key was extrapolated to two kilobytes per second. The DES implementation was measured at 33.9 kilobytes per second. The cryptosystem of the present invention was measured at 1,521 kilobytes per second. The present invention resulted in encryption 45 times faster than DES and 760 times faster than the RSA implementation.

Having described specific embodiments of the present invention, it will be understood that modifications thereof may be suggested to those skilled in the art, and it is intended to cover all such modifications as fall within the scope and spirit of the appended claims.

What is claimed:

1. A data encryption and decryption system comprising:
   a. means for selecting a set of parameters from a predetermined parameter space;
   b. means for inserting the parameters into chaotic equations of the form:

$$x' = -\sigma x + \sigma y$$
   $$y' = rx - y - xz$$
   $$z' = -bz + xy$$

where x', y' and z' are numeric results and x, y, z, σ, r and b are parameters;
   c. means for iterating the chaotic equations to derive x', y' and z' iterate streams;
   d. means for testing at least one of the iterate streams for chaotic behavior;
   e. means for deriving a cipher number from the iterate streams; and
   f. means for xoring the cipher number with the data.

2. The system of claim 1, wherein the means for deriving a cipher number includes means for selecting a byte of data from the iterate streams.

3. The system of claim 2, wherein the byte of data selected is the fourth byte of the z' iterate stream.

4. The system of claim 1, wherein at least one of the (σ, r and b parameters are varied during iteration of the equations.

5. The system of claim 1, wherein the predetermined parameter space further comprises one parameter from each of the following ranges:
   x=about −30 to about 50
   y=about −30 to about 50
   z=about −30 to about 50
   σ=about 0.006 to about 0.028
   b=about 1 to about 8
   r=about 24 to about 40
   Where x, y and z are not simultaneously equal to 0.

6. The system of claim 1, wherein the predetermined parameter space further comprises one parameter from each of the following ranges:
   x=about −30 to about 50
   y=about −30 to about 50
   z=about 20 to about 50
   σ=about 0.006 to about 0.0125
   b=about 2.5 to about 7
   r=about 24 to about 40
   Where x, y and z are not simultaneously equal to 0.

7. The system of claim 1, further comprising:
   a. means for iterating the chaotic equations a predetermined number of times;
   b. means for encoding the predetermined number; and
   c. means for appending the encoded number to encrypted data.

8. A data encryption and decryption system comprising:
   a. storage means containing multiple sets of parameters from a parameter space;
   b. means for selecting a set the parameters from the storage means;

c. means for inserting the selected parameters into chaotic equations of the form:

$$x'=-\sigma x+\sigma y$$
$$y'=rx-y-xz$$
$$z'=-bz+xy$$

where x', y' and z' are numeric results and x, y, z, σ, r and b are parameters, d. means for iterating the chaotic equations to derive x', y' and z' iterate streams;

e. means for testing at least one of the iterate streams for chaotic behavior;

f. means for deriving a cipher number from the iterate streams;

g. means for xoring the cipher number with the data;

h. means for storing the numeric results.

9. A data encryption and decryption system comprising:

a. means for selecting a set of parameters from a parameter space;

b. means for inserting the parameters into chaotic equations of the form:

$$x'=-\sigma x+\sigma y$$
$$y'=rx-y-xz$$
$$z'=-bz+xy$$

where x', y' and z' are numeric results and x, y, z, s, r and b are parameters, c. means for iterating the chaotic equations to derive x', y' and z' iterate streams;

d. means for testing at least one of the iterate streams for chaotic behavior;

e. means for deriving a cipher number from the iterate streams;

f. means for xoring the cipher number with the data;

g. means for iterating the chaotic equations a predetermined number of times; and h. means for appending the predetermined number to encrypted data.

10. A data encryption system comprising:

a. a set of initial conditions;

b. a protocol responsive memory programmed to store and allow access to the initial conditions in response to a protocol;

c. a processor connected to the protocol responsive memory, the processor programmed to:
  (1) execute the protocol;
  (2) receive and store the initial conditions returned by the protocol responsive memory;
  (3) insert the initial conditions into and iterate a set of chaotic equations to arrive at iterated results; and
  (4) create encrypted data by combining data with the iterated results.

11. The data encryption systems of claim 10, further comprising a transmitter connected to the processor for transmitting the encrypted data.

12. The data encryption system of claim 10, further comprising a second memory connected to the processor to store the encrypted data.

13. The system of claim 10, wherein the set of chaotic equations are of the form:

$$x'=-\sigma x+\sigma y$$
$$y'=rx-y-xz$$
$$z'=-bz+xy$$

where x', y' and z' are iterated results of initial conditions x, y, z, σ, r, and b.

14. The system of claim 13, wherein the initial conditions are in the range:

x=about −30 to about 50
y=about −30 to about 50
z=about −30 to about 50
σ=about 0.006 to about 0.028
b=about 1 to about 8
r=about 24 to about 40

Where x, y and z are not simultaneously equal to 0.

15. The system of claim 13, wherein the initial conditions further comprise one parameter from each of the following ranges:

x=about −30 to about 50
y=about −30 to about 50
z=about 20 to about 50
s=about 0.006 to about 0.0125
b=about 2.5 to about 7
r=about 24 to about 40

Where x, y and z are not simultaneously equal to 0.

16. The system of claim 10, wherein the processor encrypts data by xoring data to be encrypted after a preselected number of iterations of the chaotic equations.

17. The data encryption system comprising:

a. a set of initial conditions;

b. a protocol responsive memory programmed to store and allow access to the initial conditions in response to a protocol;

c. a processor connected to the protocol responsive memory, the processor programmed to:
  (1) execute the protocol;
  (2) receive and store the initial conditions returned by the protocol responsive memory;
  (3) insert the initial conditions into and iterate a set of chaotic equations to arrive at iterated results;
  (4) create encrypted data by combining data with the iterated results;

d. a memory partition for storing a read password; and e. a comparator, connected to the memory partition and to the processor, for executing the protocol.

18. The system of claim 17, wherein the protocol comprises:

a. a check password generated by the processor and transmitted to the comparator;

b. a comparison of the check password to the read password by the comparator;

c. transmission of the initial conditions by the protocol responsive memory to the processor if the comparison results in a match between the check password and the read password.

19. A data encryption system comprising:

a. a set of initial conditions;

b. a protocol responsive memory programmed to store and allow access to the initial conditions in response to a protocol;

c. a processor connected to the protocol responsive memory, the processor programmed to:

(1) execute the protocol;
(2) receive and store the initial conditions returned by the protocol responsive memory;
(3) insert the initial conditions into and iterate a set of chaotic equations to arrive at iterated results;
(4) create encrypted data by combining data with the iterated results;
f. the protocol comprising:
(1) generation of an address by the processor;
(2) transmission of the address by the processor to the protocol responsive memory; and
(3) transmission of the initial conditions by the protocol responsive memory to the processor upon receipt of the address by the protocol responsive memory.

20. A data encryption system comprising:
a. a set of initial conditions;
b. a protocol responsive memory programmed to store and allow access to the initial conditions in response to a protocol;
c. a processor connected to the protocol responsive memory, the processor programmed to:
(1) execute the protocol;
(2) receive and store the initial conditions returned by the protocol responsive memory;
(3) insert the initial conditions into and iterate a set of chaotic equations to arrive at iterated results;
(4) create encrypted data by combining data with the iterated results; and
d. a memory connected to the processor to store and allow access to the iterated results of the initial conditions.

21. An encryption system comprising:
a. a first memory for holding data to be encrypted;
b. a second memory for holding encrypted data;
c. a slave processor having a memory for storage of initial conditions and a memory for storage of a password;
d. the slave processor programmed to release the initial conditions upon receipt of the password;
e. a master processor connected to the first and second memories and the slave processor, programmed to:
(1) send the password to the slave processor;
(2) store the initial conditions returned by the slave processor;
(3) iteratively apply the initial conditions to equations of the following type:

$x'=\sigma x+\sigma y$ $y'=rx-y-xz$ $z'=-bz+xy$ where x', y' and z' are iterated results of the equations given initial conditions x, y, z, σ, r, and b;
(4) test the iterated results for chaotic behavior;
(5) read data from the first memory;
(6) combine the data with the iterated results to create encrypted data; and
(7) store the encrypted data in the second memory.

22. The system of claim 21, wherein the master processor is programmed to vary at least one of the σ, r and b parameters before iteratively applying the initial conditions.

23. The system of claim 21, wherein the master processor combines the data with the iterated results by xoring at least one byte of data with the fourth byte of the z' iterated results.

24. The encryption system of claim 21, further comprising:

a. a third memory connected to the processor for holding the iterated results of the equations; and
b. the master processor being further programmed to insert the iterated results into the equations.

25. The encryption system of claim 21, wherein the initial conditions are in the range:
x=about −30 to about 50
y=about −30 to about 50
z=about −30 to about 50
σ=about 0.006 to about 0.028
b=about 1 to about 8
r=about 24 to about 40
Where x, y and z are not simultaneously equal to 0.

26. The system of claim 21, wherein the predetermined parameter space further comprises one parameter from each of the following ranges:
x=about −30 to about 50
y=about −30 to about 50
z=about 20 to about 50
σ=about 0.006 to about 0.0125
b=about 2.5 to about 7
r=about 24 to about 40
Where x, y and z are not simultaneously equal to 0.

27. The encryption system of claim 21, wherein the master processor is a member of the Motorola 68000 family of microprocessors.

28. The encryption system of claim 21, wherein the master processor is a member of the Intel Ix86 family of microprocessors.

29. The encryption system of claim 21, wherein the slave processor is the Xicor x76041.

30. The encryption system of claim 21, wherein the processor is programmed to iterate the equations a predetermined number of times before combining the data with the iterated results.

31. The encryption system of claim 21, wherein the initial conditions are determined by the master processor to be valid through iterative application of the equations.

32. A data encryption system comprising:
a. a first memory for holding data to be encrypted;
b. a second memory for holding encrypted data;
c. a third memory for holding a master processor password;
d. an input device;
e. a slave processor having a memory for storage of a serial number, a read password and a set of initial conditions;
f. the slave processor programmed to release the serial number when polled and to release the initial conditions only upon receipt of the read password;
g. a master processor connected to the first, second and third memories and the input device and removably connected to the slave processor;
h. the master processor programmed to:
(1) poll the slave processor and store the serial number returned by the slave processor in temporary memory;
(2) access the input device and store identification data input from the input device in temporary memory;
(3) access the third memory, retrieve the master processor password and store the master processor password in temporary memory;
(4) xor the serial number, the identification number and the master processor password and store the result in temporary memory as the read password;

(5) transmit the read password to the slave processor;
(6) read the initial conditions returned by the slave processor;
(7) apply the initial conditions to a set of chaotic equations;
(8) iterate the chaotic equations and store iterated results;
(9) test the iterated results for chaotic behavior;
(10) read the data to be encrypted from the first memory;
(11) xor the data to be encrypted with the iterated results.

33. The system of claim 32, wherein the chaotic equations are of the form:

$$x'=-\sigma x+\sigma y$$
$$y'=rx-y-xz$$
$$z'=-bz+xy$$

where x', y' and z' are numeric results and where x, y, z, σ, b and r are initial conditions.

34. The system of claim 33, wherein the initial conditions comprise one parameter from each of the following ranges:
x=about −30 to about 50
y=about −30 to about 50
z=about −30 to about 50
σ=about 0.006 to about 0.028
b=about 1 to about 8
r=about 24 to about 40
Where x, y and z are not simultaneously equal to 0.

35. The system of claim 32, where the input device is a keyboard.

36. The system of claim 32, where the input device is a card reader.

37. The system of claim 32, where the input device identifies a physical trait of the user to be identified.

38. The system of claim 32, wherein the identification data is a personal identification number.

39. The system of claim 32, wherein the slave processor is a XICOR x76041.

40. The system of claim 32, wherein the master processor is a member of the Intel Lx86 family of microprocessors.

41. The system of claim 32, wherein the master processor is a member of the MOTOROLA 68000 family of microprocessors.

42. The system of claim 32, wherein the master processor is further programmed to iterate the chaotic equations a preselected number of times before xoring the data to be encrypted with the iterated results.

43. The system of claim 32, wherein the master processor is further programmed to insert the stored iterated results into the chaotic equations before iterating the chaotic equations.

44. The system of claim 32, further comprising:
 a. a nonvolatile memory means for storing the iterated results; and
 b. the master processor further programmed to:
  (1) poll the nonvolatile memory means and determine if iterated results have been stored there; and
  (2) insert the iterated results into the chaotic equations before iterating chaotic equations if iterated results have been found in the nonvolatile memory.

45. A method of encrypting data comprising of the steps of:

a. inserting a set of parameters into a set of chaotic equations of the form:

$$x'=-\sigma x+\sigma y$$
$$y'=rx-y-xz$$
$$z'=-bz+xy$$

where x, y, z, σ, b and r are parameters and x', y' and z' are numeric results;
b. varying at least one of the σ, r and b parameters;
c. iterating the chaotic equations to derive an iterate stream;
d. testing at least one iterate stream to determine chaotic behavior;
e. using the iterate stream to create a cipher stream; and
f. encrypting data by combining the cipher stream with the data.

46. The method of claim 45, wherein the step of using the iterate stream includes selecting one or more bytes from the iterate stream as the cipher stream.

47. The method of claim 45, further comprising the step of:
a. iterating the chaotic equations a predetermined number of times before creating the cipher stream.

48. The method of claim 45, further comprising the step of selecting the set of parameters from the following parameter space:
x=about −30 to about 50
y=about −30 to about 50
z=about −30 to about 50
σ=about 0.006 to about 0.028
b=about 1 to about 8
r=about 24 to about 40
Where x, y and z are not simultaneously equal to 0.

49. The system of claim 45, further comprising the step of selecting the set of parameters from the following parameter space:
x=about −30 to about 50
y=about −30 to about 50
z=about 20 to about 50
s=about 0.006 to about 0.0125
b=about 2.5 to about 7
r=about 24 to about 40
Where x, y and z are not simultaneously equal to 0.

50. The method of claim 45, further comprising the steps of:
a. storing the numeric results; and
b. using the stored numeric results in the chaotic equations to create a subsequent cipher stream.

51. A method of encrypting data comprising the steps of:
a. testing one or more sets of parameters to determine a seed space which exhibits chaotic behavior when applied to a set of chaotic equations of the form:

$$x'=-\sigma x+\sigma y$$
$$y'=rx-y-xz$$
$$z'=-bz+xy$$

where x, y, z, σ, b and r are parameters and x', y' and z' are numeric results;

b. selecting a set of parameters from the seed space;

c. inserting the parameters into the chaotic equations;

d. iterating the chaotic equations to derive are x' iterate stream, a y' iterate stream and a z' iterate stream;

e. xoring data with the x' iterate streams, the y' iterate stream or the z' iterate stream to create encrypted data.

52. The method of claim 51, further comprising:

a. xoring the x' iterate stream, the y' iterate stream and the z' iterate stream to obtain the cipher stream.

53. The method of claim 51, further comprising the step of:

a. iterating the chaotic equations a preselected number of times before xoring an iterate stream with the data.

54. The method of claim 51, wherein the seed space further comprises one value from each of the following ranges:

x=about −30 to about 50
y=about −30 to about 50
z=about −30 to about 50
σ=about 0.006 to about 0.028
b=about 1 to about 8
r=about 24 to about 40

Where x, y and z are not simultaneously equal to 0.

55. The method of claim 51, further comprising the steps of:

a. storing the numeric results; and b. using the stored numeric results in the chaotic equations to create a subsequent cipher stream.

56. A decryption system comprising:

a. a first memory for holding data to be encrypted;

b. a second memory for holding encrypted data;

c. a slave processor having a memory for storage of initial conditions and a memory for storage of a password;

d. the slave processor programmed to release the initial conditions upon receipt of the password;

e. a master processor connected to the first and second memories and the slave processor, programmed to:
  (1) send the password to the slave processor;
  (2) store the initial conditions returned by the slave processor;
  (3) iteratively apply the initial conditions to equations of the following type:

$$x'=\sigma x+\sigma y$$

$$y'=rx-y-xz$$

$$z'=-bz+xy$$

where x', y' and z' are iterated results of the equations given initial conditions x, y, z, σ, r, and b;
  (4) test the iterated results for chaotic behavior;
  (5) read data from the first memory;
  (6) combine the data with the iterated results to create encrypted data; and
  (7) store the encrypted data in the second memory.

57. The system of claim 56, wherein the processor is programmed to iterate the equations a predetermined number of times before combining the data with the iterated results.

58. The system of claim 56, wherein the master processor is further programmed to combine the data with itemized results by combining at least one byte of data with the fourth byte of the z' iterate stream.

59. A data decryption system comprising:

a. a set of initial conditions;

b. a protocol responsive memory programmed to store and allow access to the initial conditions in response to a protocol;

c. a processor connected to the protocol responsive memory, the processor programmed to:
  (1) execute the protocol;
  (2) receive and store the initial conditions returned by the protocol responsive memory;
  (3) insert the initial conditions into and iterate a set of chaotic equations to arrive at iterated results; and
  (4) create decrypted data by xoring the data with the iterated results.

60. The data decryption system of claim 59, further comprising a transmitter connected to the processor for transmitting the decrypted data.

61. The data decryption system of claim 59, further comprising a second memory connected to the processor to store the decrypted data.

62. The system of claim 59, wherein the set of chaotic equations are of the form:

$$x'=-\sigma x+\sigma y$$

$$y'=rx-y-xz$$

$$z'=-bz+xy$$

where x', y' and z' are iterated results of initial conditions x, y, z, σ, r, and b.

63. The system of claim 62, wherein the initial conditions are in the range:

x=about −30 to about 50
y=about −30 to about 50
z=about −30 to about 50
σ=about 0.006 to about 0.028
b=about 1 to about 8
r=about 24 to about 40

Where x, y and z are not simultaneously equal to 0.

64. A data decryption system comprising:

a. a first memory for holding data to be encrypted;

b. a second memory for holding encrypted data;

c. a third memory for holding a master processor password;

d. an input device;

e. a slave processor having a memory for storage of a serial number, a read password and a set of initial conditions;

f. the slave processor programmed to release the serial number when polled and to release the initial conditions only upon receipt of the read password;

g. a master processor connected to the first, second and third memories and the input device and removably connected to the slave processor;

h. the master processor programmed to:
  (1) poll the slave processor and store the serial number returned by the slave processor in temporary memory;
  (2) access the input device and store identification data input from the input device in temporary memory;
  (3) access the third memory, retrieve the master processor password and store the master processor password in temporary memory;
  (4) xor the serial number, the identification number and the master processor password and store the result in temporary memory as the read password;

(5) transmit the read password to the slave processor;
(6) read the initial conditions returned by the slave processor;
(7) apply the initial conditions to a set of chaotic equations;
(8) iterate the chaotic equations and store iterated results;
(9) test the iterated results for chaotic behavior;
(10) read the data to be encrypted from the first memory;
(11) xor the data to be encrypted with the iterated results.

65. The system of claim 64, wherein the initial conditions are iterated by the master processor before being stored in the slave processor.

66. The system of claim 64, wherein the chaotic equations are of the form:

$$x' = -\sigma x + \sigma y$$
$$y' = rx - y - xz$$
$$z' = -bz + xy$$

where x', y' and z' are numeric results and where x, y, z, σ, b and r are initial conditions.

67. The system of claim 64, wherein the initial conditions comprise one parameter from each of the following ranges:

x=about −30 to about 50
y=about −30 to about 50
z=about −30 to about 50
σ=about 0.006 to about 0.028
b=about 1 to about 8
r=about 24 to about 40
Where x, y and z are not simultaneously equal to 0.

68. The system of claim 64, wherein the master processor is further programmed to iterate the chaotic equations a preselected number of times before xoring the data to be decrypted with the iterated results.

69. A method of decrypting data comprising of the steps of:
a. testing a plurality of sets of parameters to determine a group of preferred parameters which exhibit chaotic behavior;
b. selecting one set from the group of preferred parameters;
c. inserting the set of parameters into chaotic equations of the form:

$$x' = -\sigma x + \sigma y$$
$$y' = rx - y - xz$$
$$z' = -bz + xy$$

where x, y, z, σ, r and b are parameters and x', y' and z' are numeric results;
d. iterating the chaotic equations to derive a x' iterate stream, a y' iterate and a z' iterate stream;
e. creating a cipher stream by choosing a segment of one or more iterate streams; and
f. decrypting data by combining the cipher stream with the data.

70. The method of claim 69, further comprising the step of using the iterate streams includes the step of selecting the fourth byte of the z' iterate stream as the cipher stream.

71. The method of claim 69, further comprising the step of varying the σ, r or b parameters during iteration of the chaotic equations.

72. The method of claim 69, further comprising the step of iterating the chaotic equations a predetermined number of times before creating the cipher stream.

73. The method of claim 69, wherein the step of selecting a set of parameters further comprises inserting parameters into the chaotic equations and testing the iterate streams for chaotic behavior.

74. The method of claim 69, wherein the step of selecting a set of parameters further comprises:
a. selecting a set of parameters from the following parameter space:
x=about −30 to about 50
y=about −30 to about 50
z=about −30 to about 50
σ=about 0.006 to about 0.028
b=about 1 to about 8
r=about 24 to about 40
Where x, y and z are not simultaneously equal to 0.

75. A method of encrypting and decrypting data comprising the steps of:
a. selecting a set of parameters from a predetermined seed space;
b. inserting the parameters into chaotic equations of the form:

$$x' = -\sigma x + \sigma y$$
$$y' = rx - y - xz$$
$$z' = -bz + xy$$

where x, y, z, σ, b and r are parameters and x', y' and z' are numeric results;
c. iterating the chaotic equations to derive an x' iterate stream, a y' iterate stream and a z' iterate stream;
d. testing at least one iterate stream for chaotic behavior;
e. choosing at least one iterate stream as a cipher number;
f. encrypting data by xoring the cipher number with the unencrypted data; and
g. decrypting data by xoring the cipher number with the encrypted data.

76. The method of claim 75, further comprising the step of iterating the equations a predetermined number of times before xoring the cipher number with the data.

77. The method of claim 75, wherein the predetermined seed space further comprises one value from each of the following ranges:
x=about −30 to about 50
y=about −30 to about 50
z=about −30 to about 50
σ=about 0.006 to about 0.028
b=about 1 to about 8
r=about 24 to about 40
Where x, y and z are not simultaneously equal to 0.

78. The method of claim 75, further comprising the step of testing at least one iterate stream for chaotic results.

* * * * *